United States Patent
Ayres et al.

(10) Patent No.: US 7,848,595 B2
(45) Date of Patent: Dec. 7, 2010

(54) PROCESSING DATA PIXELS IN A HOLOGRAPHIC DATA STORAGE SYSTEM

(75) Inventors: Mark R. Ayres, Boulder, CO (US); Alan Hoskins, Denver, CO (US); Kevin R. Curtis, Longmont, CO (US)

(73) Assignee: InPhase Technologies, Inc., Longmont, CO (US)

( * ) Notice: Subject to any disclaimer, the term of this patent is extended or adjusted under 35 U.S.C. 154(b) by 1067 days.

(21) Appl. No.: 11/069,007

(22) Filed: Feb. 28, 2005

(65) Prior Publication Data

US 2005/0286388 A1  Dec. 29, 2005

Related U.S. Application Data

(63) Continuation-in-part of application No. 10/879,847, filed on Jun. 28, 2004.

(51) Int. Cl.
*G06K 9/32* (2006.01)
*G06K 9/36* (2006.01)
(52) U.S. Cl. .................................. 382/294; 382/287
(58) Field of Classification Search ................. 382/209, 382/210, 287, 289, 294, 299, 300; 359/16, 359/22

See application file for complete search history.

(56) References Cited

U.S. PATENT DOCUMENTS

| | | | |
|---|---|---|---|
| 5,511,058 A | | 4/1996 | Visel et al. |
| 5,528,702 A | * | 6/1996 | Mitsuoka et al. ............ 382/211 |
| 5,694,488 A | | 12/1997 | Hartmann |
| 5,838,650 A | | 11/1998 | Campbell et al. |
| 5,940,537 A | | 8/1999 | Regen et al. |
| 5,963,675 A | * | 10/1999 | van der Wal et al. ........ 382/260 |
| 5,982,513 A | | 11/1999 | Zhou et al. |
| 6,064,586 A | * | 5/2000 | Snyder et al. ............... 365/125 |
| 6,226,415 B1 | | 5/2001 | Wilson et al. |
| 6,285,474 B1 | * | 9/2001 | Kawano et al. ............... 359/29 |
| 6,414,296 B1 | | 7/2002 | Edwards |
| 6,414,763 B1 | | 7/2002 | Hesselink et al. |
| 6,687,419 B1 | * | 2/2004 | Atkin ......................... 382/284 |
| 6,697,316 B2 | | 2/2004 | Burr |
| 6,847,907 B1 | * | 1/2005 | Novotny ...................... 702/84 |
| 7,116,626 B1 | | 10/2006 | Woods et al. |

(Continued)

FOREIGN PATENT DOCUMENTS

EP   0 817 201 A2   1/1998

OTHER PUBLICATIONS

Burr, G.W. (Apr. 1, 2002). "Holographic Data Storage with Arbitrarily Misaligned Data Pages," *Optics Letters* 27(7):542-544.

(Continued)

*Primary Examiner*—Yubin Hung
(74) *Attorney, Agent, or Firm*—Morrison & Foerster LLP

(57) ABSTRACT

A method for processing data pixels in a holographic data storage system is disclosed. The method includes assigning predetermined reserved blocks throughout each data page, where each reserved block comprises known pixel patterns, determining position errors of the data page by computing the best match between regions of the data page and the predetermined reserved blocks, and compensating the data pixels at the detector in accordance with the corresponding position errors of the data page.

29 Claims, 10 Drawing Sheets

U.S. PATENT DOCUMENTS

| | | |
|---|---|---|
| 2002/0041705 A1* | 4/2002 | Lin et al. .................... 382/165 |
| 2002/0094116 A1* | 7/2002 | Frost et al. .................. 382/129 |
| 2003/0092194 A1* | 5/2003 | Gambini et al. ............. 436/172 |
| 2004/0027668 A1* | 2/2004 | Ayres et al. ................. 359/566 |
| 2004/0179738 A1* | 9/2004 | Dai et al. .................... 382/218 |

OTHER PUBLICATIONS

Burr, G. et al. (Apr. 15, 2001). "Compensation for Pixel Misregistration in Volume Holographic Data Storage," *Optics Letters* 26(8):542-544.

Chugg, K.M. et al. (Mar. 1999). "Two-Dimensional Equalization in Coherent and Incoherent Page-Oriented Optical Memory," *J. Opt. Soc. Am. A* 16(3):549-562.

Heanue, J. F. et al. (May 10, 1996). "Signal Detection for Page-access Optical Memories with Intersymbol Interference," *Applied Optics* 35(14):2431-2438.

Keskinoz, M. et al. (Feb. 20, 2004). "Discrete Magnitude-Squared Channel Modeling, Equalization, and Detection for Volume Holographic Storage Channels," *Applied Optics* 43(6):1368-1378.

Keskinoz, M. et al. (Jul. 10, 1999). "Application of Linear Minimum Mean-Squared-Error Equalization for Volume Holographic Data Storage," *Applied Optics* 38(20):4387-4393.

Menetrier, L. et al. (Feb. 10, 2003). "Density Implications of Shift Compensation Postprocessing in Holographic Storage Systems," Applied Optics 42(5):845-860.

Redfield, S. et al. (2000). "Tamarack Optical Head Holographic Storage," In *Holographic Data Storage*, Coufal, H.J et al. eds., Springer-Verlag, New York, NY. pp. 343-357.

Shelby, R. M. et al. (Oct. 1, 1997). "Pixel-matched Holographic Data Storage with Megabit Pages," *Optics Letters* 22(19):1509-1511.

Smith, J. O. et al. (1984). "A Flexible Sampling-Rate Conversion Method," *Proc. IEEE Int. Conf. Acoustic Speech Signal Processing* 2:19.4.1-19.4.4.

Vadde, V. et al. (1997). "Channel Estimation and Intra-Page Equalization for Digital Volume Holographic Data Storage," *Optical Data Storage* 3109:245-250.

Vadde, V. et al. (Jul. 10, 1999). "Channel Modeling and Estimation for Intrapage Equalization in Pixel-Matched Volume Holographic Data Storage," *Applied Optics* 38(20):4374-4386.

Yoon, P. et al. (2004). "Image Compensation for Sub-pixel Misalignment in Holographic Data Storage," *ISOM Proceedings*, two pages.

International Search Report mailed on Oct. 3, 2008, for PCT Application No. PCT/US06/07046, filed on Feb. 27, 2006, six pages.

Written Opinion mailed on Oct. 3, 2008, for PCT Application No. PCT/US06/07046, filed on Feb. 27, 2006, six pages.

Final Office Action mailed on Oct. 6, 2008, for U.S. Appl. No. 10/879,847, filed Jun. 28, 2004, sixteen pages.

Non-Final Office Action mailed on Apr. 21, 2008, for U.S. Appl. No. 10/879,847, filed Jun. 28, 2004, fifteen pages.

Non-Final Office Action mailed on Apr. 30, 2009, for U.S. Appl. No. 10/879,847, filed Jun. 28, 2004, twenty pages.

* cited by examiner

PROCESSING DATA PIXELS IN A HOLOGRAPHIC DATA STORAGE SYSTEM

CROSS-REFERENCE TO RELATED APPLICATIONS

This application is a continuation-in-part application and claims the benefit of co-pending U.S. application Ser. No. 10/879,847, "Method and System for Equalizing Holographic Data Pages," filed on Jun. 28, 2004, which is assigned to the assignee of the present application and which is incorporated herein in its entirety by reference.

FIELD OF THE INVENTION

The present invention relates to the field of holographic data storage systems. In particular, the present invention relates to processing data pixels in a holographic data storage system.

BACKGROUND OF THE INVENTION

Holographic data storage systems store information or data based on the concept of a signal beam interfering with a reference beam at a holographic storage medium. The interference of the signal beam and the reference beam creates a holographic representation, i.e., a hologram, of data elements as a pattern of varying refractive index and/or absorption imprinted in a volume of a storage or recording medium such as a photopolymer or photorefractive crystal. Combining a data-encoded signal beam, referred to as an object beam, with a reference beam creates the interference pattern at the storage medium. A spatial light modulator (SLM), for example, can create the data-encoded signal beam. The interference pattern induces material alterations in the storage medium that generate the hologram. The formation of the hologram in the storage medium is a function of the relative amplitudes and polarization states of, and phase differences between, the signal beam and the reference beam. The hologram is also dependent on the wavelengths and angles at which the signal beam and the reference beam are projected into the storage medium. After a hologram is created in the storage medium, projecting the reference beam into the storage medium reconstructs the original data-encoded signal beam. The reconstructed signal beam may be detected by using a detector, such as CMOS photo-detector array or the like. The detected data may then be decoded into the original encoded data.

In a page-oriented holographic data storage device, it is advantageous to minimize the size of the holograms in order to achieve maximum storage density. One method of accomplishing this is minimizing the size of the page imaging aperture. However, minimizing the size of the aperture has the consequence of increasing blur, in terms of broadening the pixel spread function (PSF) in the page images. This blur decreases the signal-to-noise ratio (SNR) of the holographic storage device, which increases the bit error rate (BER) of the system, and which in turn limits the storage density.

Since blur in an image is a deterministic process, much of the SNR loss may be reclaimed by digitally post-processing the detected page image. Traditionally, the detected image is convolved with a small kernel matrix w, also known as a kernel, representing an inverse blurring operation (de-convolution), thereby implementing a finite impulse response (FIR) filter equalization.

The kernel of a FIR filter, for example a 3×3 or a 5×5 matrix, may be determined by several methods known in the current art. For example, if the page image pixel spread function is known, a zero-forcing equalizer may be designed by calculating the linear inverse of the PSF. An example of the zero-forcing method is described in "Channel estimation and intra-page equalization for digital volume holographic data storage," by V. Vadde and B. Kumar in *Optical Data Storage 1997*, pp. 250-255, 1997. Another approach is to choose FIR filter coefficients that minimize the difference between the equalized data page image and the original data page. Such a method is described in "Application of linear minimum mean-squared-error equalization for volume holographic data storage," by M. Keskinoz and B. Kumar in *Applied Optics, vol. 38, no. 20, Jul. 10, 1999*.

In a page-oriented holographic data storage device, optical detector arrays are employed to read holographic reconstructed data images. The detector array is typically pixel-matched to the holographic image. An example of a pixel-matched data storage is described by R. Shelby et al. in "Pixel-matched holographic data storage with megabit pages," *Opt. Letter* 22, pp. 1509-1511, 1997, which is incorporated herein in its entirety by reference. This approach requires exceedingly high performance optics and mechanics in order to achieve the precise alignment of each data pixel image to a detector pixel of the same size. Commercial systems have been designed using detector arrays that spatially sample the image at or above the Nyquist rate in order to read misaligned or distorted images. Such a system is described by S. Redfield et al. in "Tamarack Optical Head Holographic Storage," *Holographic Data Storage*, H. J. Coufal, D. Psaltis, and G. Sincerbox, eds., (Springer-Verlag, New York, 2000), which is incorporated herein in its entirety by reference.

However, there are a number of factors that affect the performance of the detector array. For example, there are a number of factors create variations in the width or shape of the pixel spread function throughout the field of view. For example, variations may be caused by lens aberrations and misalignment; by distortions, shrinkage, and other non-ideal media responses; and by misalignment and wavefront errors in the reconstructing reference beam. A significant consequence of these effects in a pixel-matched system is the degradation of the pixel matching, because image distortion shifts local areas of the image with respect to the detector pixels. For example, a uniform shrinkage of the medium causes the holographic image to be magnified, producing a radial displacement such that data pixel images are no longer centered on their respective detector pixels. Even neglecting distortions, image shifts and rotations caused by medium misregistration and other non-ideal component alignments dictate that micro-actuators are employed in order to effect dynamic image-to-detector alignment.

G. Burr et al. in "Compensation for pixel misregistration in volume holographic data storage," *Opt. Letter* 26, pp. 542-544, 2001 and P. Yoon et al. in "Image Compensation for Sub-pixel Misalignment in Holographic Data Storage," *ISOM Proceedings*, 2004, have proposed methods for restoring the fidelity of partially misaligned (less than half a pixel) images, but realistic tolerance models indicate that image shifts of up to several hundreds of microns may be encountered in a unit in the field.

Sampling theory indicates that if the holographic image is spatially sampled in each linear dimension at least twice the frequency of its highest component (the Nyquist frequency), then the signal may be captured losslessly. For holographic data storage (especially in the Fourier Transform geometry), it is advantageous to limit the spatial bandwidth of the data beam to only slightly higher than the Nyquist frequency of the data pattern. Since the data pattern can contain at most one cycle per two pixels, the Nyquist frequency becomes one sample per pixel. Typically, an aperture in a Fourier plane is used to band-limit the data beam, thereby minimizing the size of the holograms.

Although the spectral content of the electromagnetic field impinging on the detector may be captured with one synchronous sample per pixel in theory, the detector can only detect irradiance but not field strength in practice. The spectrum of an irradiance pattern is the autocorrelation of the spectrum of the corresponding electromagnetic field distribution; therefore the spatial bandwidth of the signal actually available to the system doubles. Thus it requires at least two detector samples per data pixel image (for a total of four detector pixels per data image pixel in two dimensions) in order to losslessly sample the irradiance pattern at the detector. This approach is described by T. Visel et al. in "Distortion correction of a reconstructed holographic data image," U.S. Pat. No. 5,511,058, and by A. Hartmann in "Method and apparatus for processing of reconstructed holographic images of digital data patterns," U.S. Pat. No. 5,694,448, both of which are incorporated herein in their entirety by reference. However, the irradiance pattern is not of primary importance to the operation of the device. It is instead the underlying data pattern that is significant. The magnitude-squared transformation that generates the higher harmonics creates new problems because it is non-linear.

Another solution is to make the ratio of detector pixels to data image pixels closer to one than to four. This method is described by G. Burr in "Holographic data storage with arbitrarily misaligned data pages," *Opt. Letter* 27, pp. 542-544, 2002, which is incorporated herein it its entirety by reference. However, this method requires an aperture much larger than Nyquist, which degrades quickly with distortions and noise.

Therefore, new methods and systems for addressing the above issues of the prior art methods are needed. In particular, methods for recovering arbitrarily aligned and distorted data pages are needed to improve the storage density of the holographic data storage system.

SUMMARY

In one embodiment, a method for processing data pixels in a holographic data storage system is disclosed. The method includes assigning predetermined reserved blocks throughout each data page, where each reserved block comprises known pixel patterns, determining position errors of the data page by computing the best match between regions of the data page and the predetermined reserved blocks, and compensating the data pixels at the detector in accordance with the corresponding position errors of the data page.

In another embodiment, a holographic data storage system includes at least one microprocessor unit for executing computer programs, a memory for storing an operating system and an application layer, a light source for providing a coherent beam of light, a storage medium for storing an encoded holographic image page, a detector for reading the encoded holographic image page, and one or more microcontrollers for controlling the detector. The holographic data storage system further includes means for assigning predetermined reserved blocks throughout each data page, where each reserved block comprises known pixel patterns, means for determining position errors of the data page by computing the best match between regions of the data page and the predetermined reserved blocks, and means for compensating the data pixels at the detector in accordance with the corresponding position errors of the data page.

In yet another embodiment, a method for processing an oversampled holographic image page includes choosing an oversampling window encompassing a data pixel in the oversampled holographic image page, determining a set of linear finite impulse response (FIR) coefficients, evaluating the performance of the set of linear FIR coefficients over a range of data pages to obtain a set of oversampling linear coefficients, and determining a state of the data pixel using the set of oversampling linear coefficients.

BRIEF DESCRIPTION OF THE DRAWINGS

The aforementioned features and advantages of the invention as well as additional features and advantages thereof will be more clearly understood hereinafter as a result of a detailed description of embodiments of the invention when taken in conjunction with the following drawings.

Like numbers are used throughout the figures.

DESCRIPTION OF EMBODIMENTS

Methods are provided for processing data pixels in a holographic data storage system. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

In a holographic data storage system, the detector (camera) is typically aligned with the holographic image during a read operation such that each pixel in the image is centered on a single pixel on the detector. This alignment process is generally referred to as "pixel matching." The objective of "pixel matching" is to sample the holographic images of data-containing holograms on the detector in a manner that preserves the information content so that the detected image that have a low bit error rate (BER). Pixel misalignment may occur because one or more components of the holographic data system may be translated or rotated causing translational, tilted, rotational, magnification, or defocusing errors in the detected image. Misalignment, unless otherwise indicated, may refer to one or more of translational, tilt, rotational, magnification, or defocusing errors of the detected image.

Equalizing a Holographic Image Page

Figure 1:
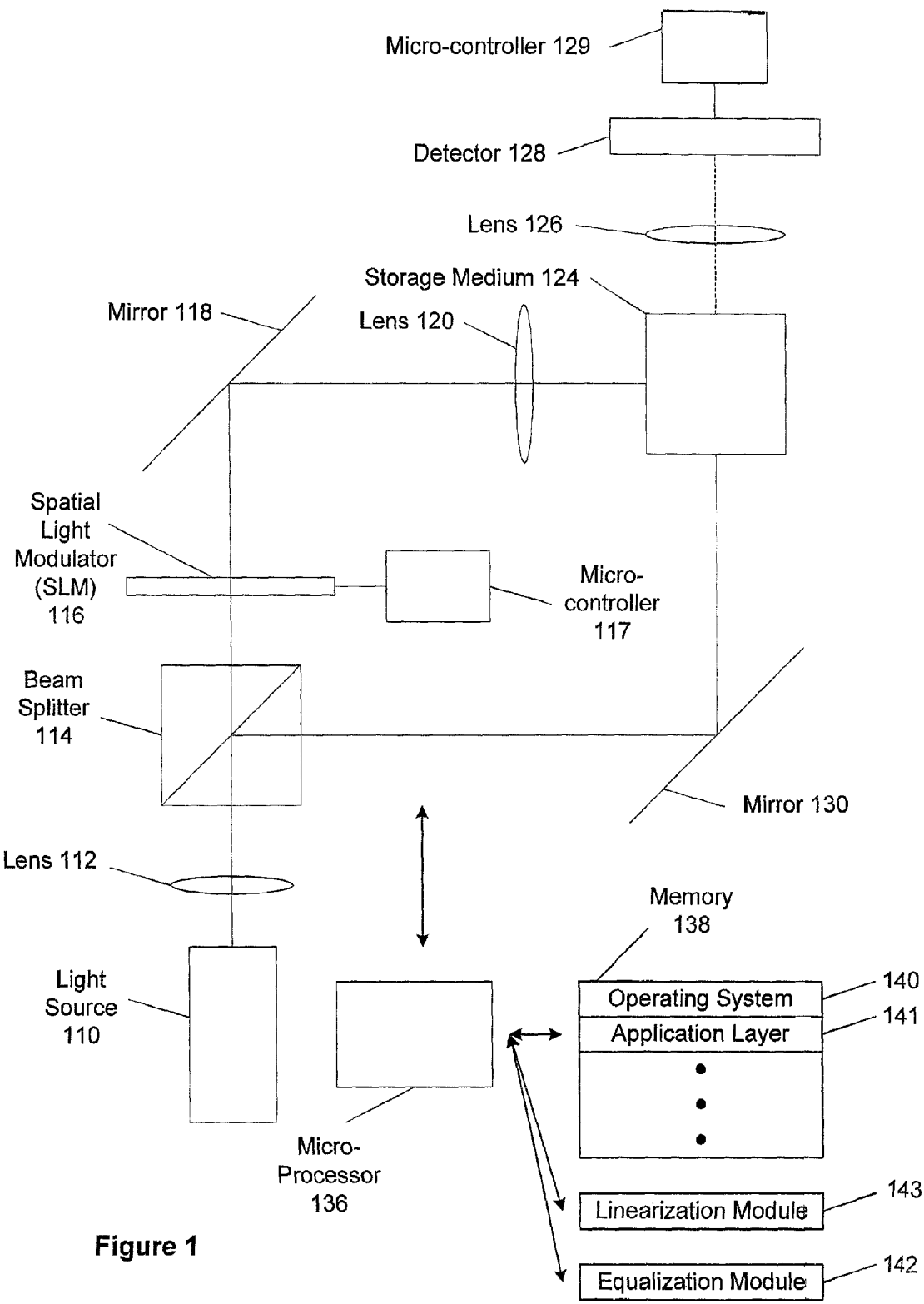
FIG. 1 illustrates a holographic data storage system according to an embodiment of the present invention.

FIG. 1 illustrates a holographic data storage system according to an embodiment of the present invention. The holographic data storage system includes a light source 110, a first lens 112, a beam splitter 114, a SLM 116, a first microcontroller 117. The holographic data storage system further includes a first mirror 118, a second lens 120, a storage medium 124, a third lens 126, a detector 128, a second microcontroller 129, a second mirror 130, a microprocessor 136 and a memory 138. The memory 138 comprises an operating system 140, an application layer 141, an equalization module 142 and a linearization module 143.

In one embodiment, the light source 110 is a laser for providing a coherent beam of light. The beam splitter 114 is positioned to split the laser beam into an object beam and a reference beam. The object beam is directed to the SLM 116 where it is encoded, for example, by an encoding unit within the first microcontroller 117. The object beam is encoded with data associated with a data page that creates a two-dimensional image signal. The signal beam, modulated with the data page image, is then directed to the recording storage medium 124 via the first mirror 118.

The first microcontroller 117 may include software and/or hardware capable of encoding data sequences into pixel values by appropriately addressing the array of addressable elements of the SLM 116. The first microcontroller 117 may also encode various registration marks or known pixel patterns for determining misalignments, i.e., rotation, translation, and the like of the SLM 116, storage medium 124, or detector 128. For example, the first microcontroller 117 may include an encoder and/or a decoder, or the like, and may address the SLM 116 and detector 128 through firmware commands or the like.

The microprocessor 136 communicates (as indicated by the double arrow) with the first microcontroller 117 as well as the memory 138 and other components of the system. The memory 138 may include high-speed random access memory and may include non-volatile memory, such as a flash RAM. The memory 138 may also include mass storage that is remotely located from the microprocessor 136. The memory 138 preferably stores:
- an operating system 140 that includes procedures for handling various basic system services and for performing hardware dependent tasks; and
- an application layer 141 for interfacing between the operating system and other applications of the holographic data storage system.

The microprocessor 136 further communicates with an equalization module 142 and a linearization module 143 of the holographic data storage system, where
- the equalization module 142 reduces the variations of signal intensity for both the ON and OFF pixels; and
- the linearization module 143 compensates the channel nonlinearity of the holographic data storage system.

The equalization module 142 and the linearization module 143 may include executable procedures, sub-modules, tables and other data structures. In other embodiments, additional or different modules and data structures may be used, and some of the modules and/or data structures listed above may not be used. The equalization module 142 and the linearization module 143 may be implemented in software and/or in hardware. When implementing in hardware, the equalization module 142 and the linearization module 143 may be implemented in application specific integrated circuits (ASICs) or in field programmable gate arrays (FPGAs).

The holographic data storage system of FIG. 1 may also include micro-actuators (not shown) configured to move at least one of the SLM 116, detector 128, and recording medium 124. According to one example, micro-actuators may be controlled, for example, by the first microcontroller 117 or the second microcontroller 129 through microprocessor 136. Microprocessor 136 may receive signals from detector 128 and use a servo feedback loop or the like to move at least one of the SLM 116, detector 128, or recording medium 124 to increase the performance of the holographic storage device. For example, an error signal associated with a misalignment may be sent to the first microcontroller 117 or the second microcontroller 129 (or a micro-controller controlling the position of storage medium 124) to activate one or more micro-actuators.

Generally, alignment of holographic components is set at the time of manufacturing. Over time, however, the components may become misaligned due to vibrations, shocks, temperature changes, medium shrinkage, and the like. The spatial extent over which stored holograms have useable signal-to-noise ratio (SNR) may be approximately only a few microns or less. Therefore, even slight movement of the hologram based on movements of the SLM, detector, or storage medium due to mechanical error, vibration, temperature change, medium shrinkage, and the like often degrades the performance of the holographic system.

In the U.S. patent application Ser. No. 10/305,769, entitled "Micro-Positioning Movement of Holographic Data Storage System Components", filed on Nov. 27, 2002 and commonly owned by InPhase Technologies, Inc., a method is disclosed for measuring page misalignment at local regions of the image by performing a cross-correlation between a part of the image and a known portion of the data page. The entire content of the Ser. No. 10/305,769 application is incorporated herein by reference. The Ser. No. 10/305,769 application further discloses how the method for measuring page misalignment may be applied at a plurality of sample positions within an image in order to generate a map of pixel misalignment over the whole image. The misalignment at each sample position is a vector with two alignment error components, $e=(\Delta x, \Delta y)$, representing the x and y misalignment, respectively, measured in pixels. Given this measured misalignment information about an image, the disclosed method utilizes the alignment error vector in improving the performance of FIR equalization.

In one embodiment, an image page is divided into n local image regions, each of which is characterized by a local alignment error vector $e_i$ (i=1 ... n). Then, each local image region is equalized with a local FIR kernel, $w_i$, which is a modified version of the global FIR kernel, w. In other words, the method determines the magnitude and direction of the local pixel alignment error for each local image region, and then compensates the local FIR kernel $w_i$ accordingly in order to remove the local pixel alignment error. In particular, $w_i$ is formed by shifting w in the opposite direction of $e_i$ so as to reverse the effects of the local pixel alignment error. For example, in the case where w is a 3-by-3 matrix, w is of the form $$w = \begin{bmatrix} w_{11} & w_{12} & w_{13} \\ w_{21} & w_{22} & w_{23} \\ w_{31} & w_{32} & w_{33} \end{bmatrix}.$$

One approach to obtain the global w matrix is by applying the linear minimum mean-squared-error (LMMSE) method over an entire known image page. Assuming $0 \leq \Delta x_i \leq 1$ and $0 \leq \Delta y_i \leq 1$ (i.e., the local pixel alignment error is positive and less than one pixel), then the local $w_i$ is computed according to the following equation:

$$w_i = (1-\Delta x_i)(1-\Delta y_i)\begin{bmatrix} w_{11} & w_{12} & w_{13} \\ w_{21} & w_{22} & w_{23} \\ w_{31} & w_{32} & w_{33} \end{bmatrix} + \quad \text{(Eqn. 1)}$$

$$\Delta x_i(1-\Delta y_i)\begin{bmatrix} 0 & w_{11} & w_{12} \\ 0 & w_{21} & w_{22} \\ 0 & w_{31} & w_{32} \end{bmatrix} +$$

$$(1-\Delta x_i)\Delta y_i\begin{bmatrix} 0 & 0 & 0 \\ w_{11} & w_{12} & w_{13} \\ w_{21} & w_{22} & w_{23} \end{bmatrix} + \Delta x_i \Delta y_i \begin{bmatrix} 0 & 0 & 0 \\ 0 & w_{11} & w_{12} \\ 0 & w_{21} & w_{22} \end{bmatrix}.$$

In this example, $w_i$ is shifted rightwards and downwards compared to w, implying that the coordinate system has been defined so that positive $\Delta x$ and $\Delta y$ correspond to leftwards and upwards, respectively. In other embodiments, $w_i$ may be shifted in the other three quadrants (i.e., $\Delta x$ and/or $\Delta y$ is negative), or the shifts ($\Delta x$ and $\Delta y$) may be greater than one, and Equation 1 may be rewritten to compensate shifts in other quadrants or changes in ranges of $\Delta x$ and $\Delta y$.

One of the benefits of the technique described above is that instead of determining each $w_i$ matrix for each local region from scratch, which typically requires having advanced knowledge of the input image and performing many computations, each $w_i$ matrix is determined according to the global w matrix and the local pixel alignment error vector. The local $w_i$ matrix is constrained in such way that only the degrees of freedom corresponding to pixel misalignment are allowed to be adjusted. Therefore, the amount of computation required in determining the local $w_i$ matrix is significantly reduced. In addition, the technique is less noise prone because it has a more accurate estimate of the $w_i$ matrix by using the local pixel alignment error that has two degrees of freedom as opposed to noise contributions from nine degrees of freedom if one were to generate the $w_i$ matrix from scratch.

In an alternative embodiment, the magnitude of the shift applied to the local FIR kernel $w_i$ may not be exactly equal to the local pixel alignment error ($\Delta x_i$, $\Delta y_i$), but rather equal to a scaled version of the local pixel alignment error, ($a_x \Delta x_i$, $a_y \Delta y_i$). The value of the scaling factors $a_x$ and $a_y$ would be determined by optimizing one or more performance metrics. An exemplary range of the scaling factors is $0<|a_x|<1$, and $0<|a_y|<1$, i.e., the optimal amount of shift is less than the full alignment error.

In other embodiments, different performance metrics may be employed to determine the scaling factors, including but not limited to signal-to-noise ratio, bit error rate or least mean square error. In addition, either experimental data or theoretical (simulated) data may be used to determine the scaling factors. Further, the scaling factors $a_x$ and $a_y$ include certain amount of noise and therefore it may be preferable not to amplify the noise by using a scale factor value less than one. Furthermore, the raw pixel alignment error $e_i$ may be spatially filtered, for instance with a low pass filter, to reject noise received from a prior measurement process, and multiple $e_i$ may be averaged to reject noise received from the prior measurement process.

In a further embodiment, the shift operation of Equation 1 may be applied to a predetermined global PSF, $h_i$ in the same direction as $e_i$ rather than directly to the FIR kernel w. In this case, a local PSF $h_i$ is determined for each image region, and the corresponding $w_i$ is determined by an inversion operation such as the zero-forcing method. A person skilled in the art will recognize that other formulae for shifting the FIR kernel w may differ from Equation 1 in manners that do not depart from the spirit and scope of the invention.

Generally, as discussed in the background section, the prior art references contemplate generating a local FIR kernel $w_i$ from scratch, for example, by using the methods of zero-forcing or LMMSE. These methods have the disadvantage that the local FIR kernel $w_i$ derived from sufficiently small local samples of an image tend to be noisy. The method described above addresses this shortcoming by incorporating prior knowledge of the global FIR kernel w, and restricting the degrees of freedom that the local data may affect. The allowed degrees of freedom, such as the x and y pixel alignment error, are expected to have the greatest variation over a real image.

This method may be further generalized by allowing other degrees of freedom in equalizing a holographic image page. In particular, blur is a parameter that may vary locally within an image, or globally over an image. Blur may be incorporated as a locally adjustable parameter according to the present method by deriving a local measurement of the blur, and then altering the local FIR kernel $w_i$ in a manner that compensates for variations in the blur compared to the expected blur in the global FIR kernel, w.

In one embodiment, the blur of the local image region is derived using a variation of the pixel misalignment measurement method of the '769 application as described above. During the calculation of the local pixel alignment error vector, a covariance matrix is generated which measures the cross correlation between zero-mean versions of a small region of the measured image pattern and the corresponding known image pattern. The covariance matrix is used as an estimate of the local PSF $h_i$. A first pixel signal error factor (PSEF) (a metric that varies inversely with blur) is derived from the local PSF by calculating the ratio of signal landing in the intended pixel location to signal landing in the neighboring pixel locations (i.e., the ratio of light striking the intended pixel to light striking its neighbors). In another embodiment, the neighboring pixel locations may include locations that are one or more pixels away from the intended pixel of interest. Similarly, a second PSEF is derived from a predetermined global PSF. Then, the first PSEF is divided by the second PSEF to form a pixel-signal-error ratio (PSER). The PSER is then used to adjust the local $w_i$ so as to compensate for the deviation from nominal blur.

In a specific implementation, only the covariance associated with the central element of the PSF, $h_{22}$, and its four nearest neighbors (immediately above, below, to the left, and to the right of $h_{22}$) are computed. The PSER becomes $$err_{PSEF} = \frac{|\hat{h}_{22}|}{|\hat{h}_{12}| + |\hat{h}_{21}| + |\hat{h}_{23}| + |\hat{h}_{32}|} \bigg/ \frac{|h_{22}|}{|h_{12}| + |h_{21}| + |h_{23}| + |h_{32}|}.$$

The local FIR kernel $w_i$ may then be modified by changing only its center element $w_{22}$:

$$w_{22'} = err_{PSEF} w_{22},$$

which adjusts the PSEF of $w_i$ by the same proportion as the detected PSEF changes, thus compensating for the local blur of the local image region.

In an alternative embodiment, the ratio of PSEF is used to equalize the local PSF, $h_i$ directly (i.e., $h'_{22} = err_{PSEF} h_{22}$), which is then used to determine $w_i$ by zero-forcing, linear minimum mean-squared-error or other methods. In yet another alternative embodiment, the applied ratio of PSEF may be rescaled by a factor between the range of $0 < ERR_{PSEF} < 1$, preferentially closer to 1, in order to minimize the effects of measurement noise. A person of ordinary skill in the art will recognize that different metrics for measuring blur and/or different methods for adjusting the local FIR kernel $w_i$ or the local PSF $h_i$ may be applied without departing from the spirit and scope of the invention.

Figure 2A:
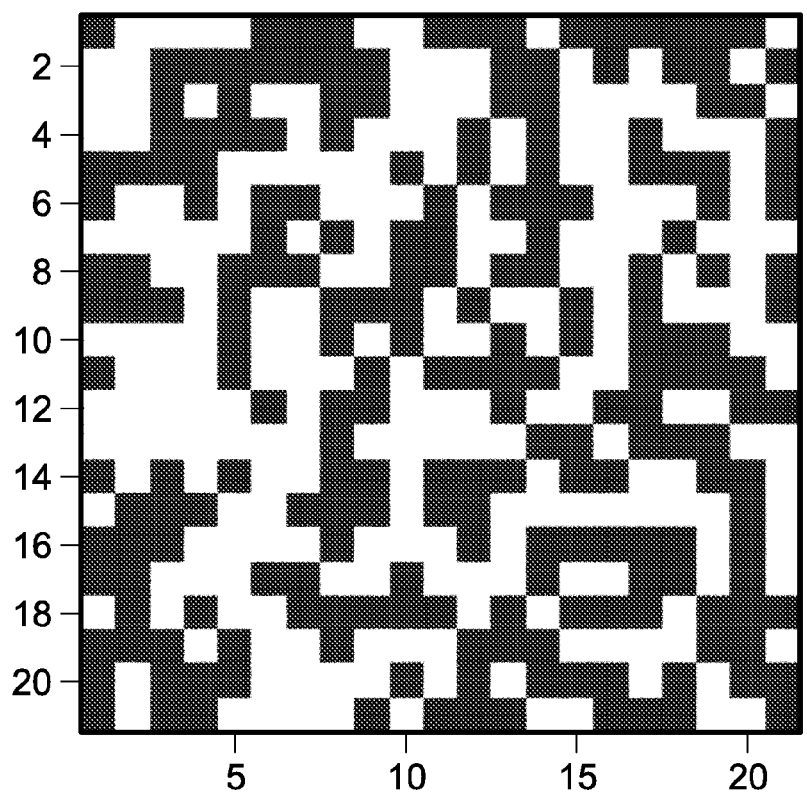
FIG. 2A illustrates an exemplary 21 pixel×21 pixel image data generated by the spatial light modulator.
Figure 2B:
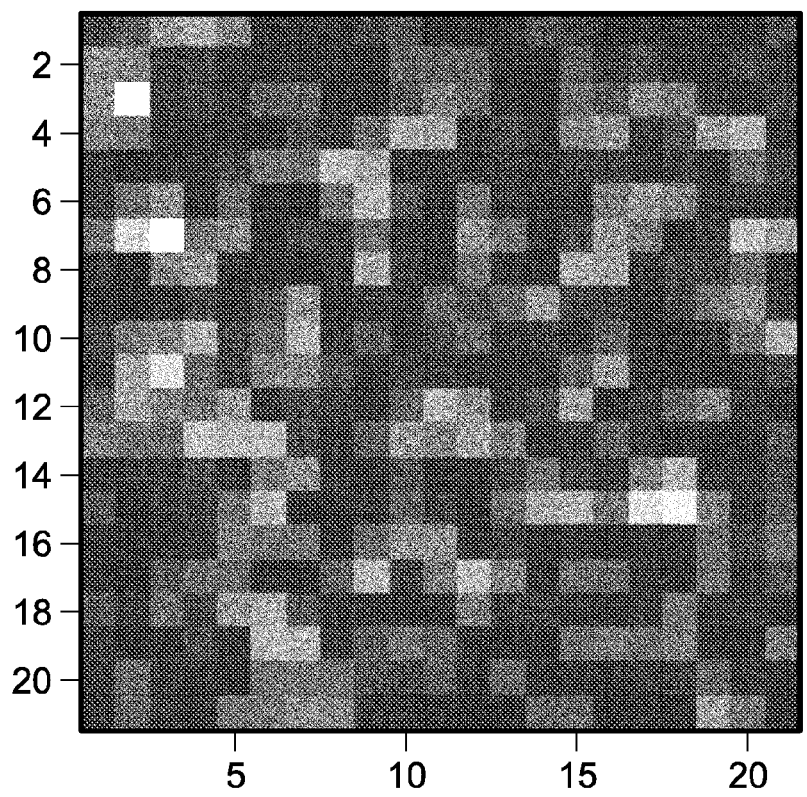
FIG. 2B illustrates the 21 pixel×21 pixel image data of FIG. 2A detected at the output of the holographic data storage system without being processed by the inventive techniques.
Figure 2C:
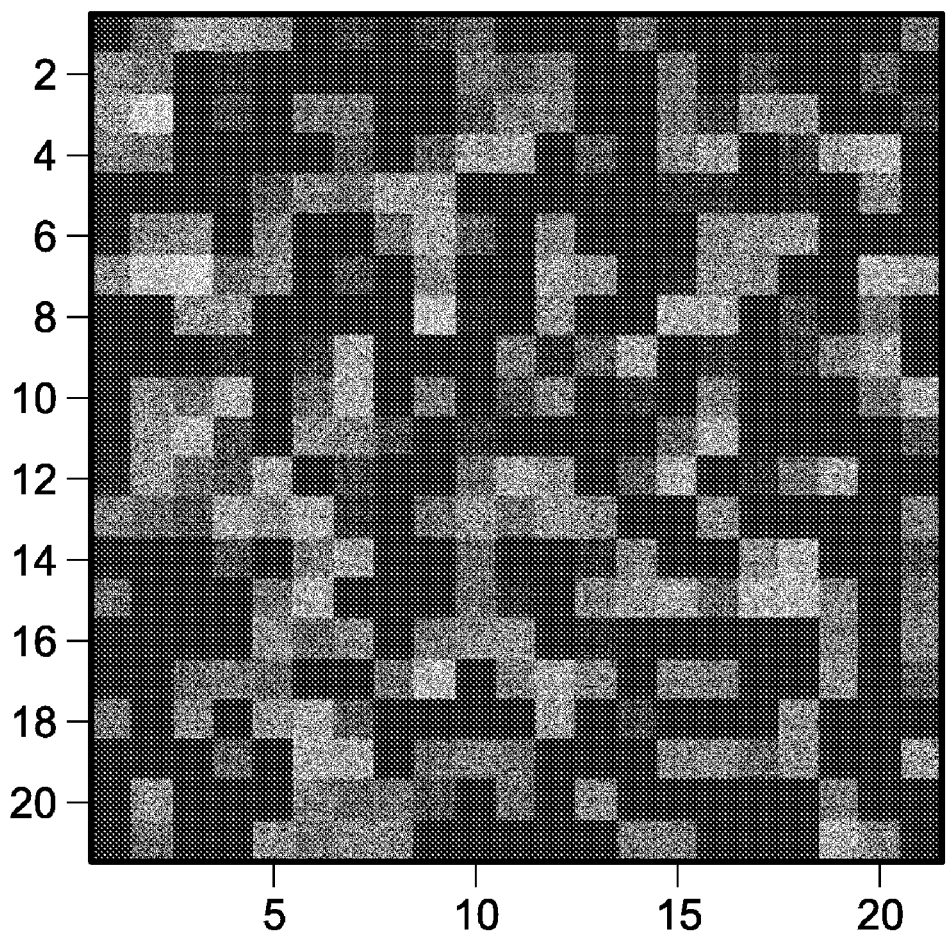
FIG. 2C illustrates the 21 pixel×21 pixel image data of FIG. 2A after being processed according to an embodiment of the present invention.

FIGS. 2A, 2B and 2C illustrate benefits of the locally variable FIR equalization technique according to an embodiment of the present invention. FIG. 2A illustrates an exemplary 21 pixel×21 pixel image data generated by the spatial light modulator. It is a raw image at the input of the holographic data storage system. An ON pixel is represented by a white 1×1 square and an OFF pixel is represented by a black 1×1 square.

FIG. 2B illustrates the 21 pixel×21 pixel image data of FIG. 2A detected at the output of the holographic data storage system without being processed by the inventive techniques. In other words, it is the corresponding image area read at the detector 128 of the holographic data storage system without being processed by the inventive techniques. As shown in FIG. 2B, there are many variations in brightness for the ON pixels, ranging from very bright to grey. For example, there are at least four levels of brightness of the ON pixels, at the coordinates (3, 7), (9, 8), (16, 6) and (16, 3) respectively. Such variations of the ON pixels are difficult to distinguish from OFF pixels. This limitation results in higher bit error rate in the holographic image page, which in turn reduces the storage density of the holographic data storage system.

FIG. 2C illustrates the 21 pixel×21 pixel image data of FIG. 2A after being processed according to an embodiment of the present invention. In other words, the image data read at the detector 128 of the holographic data storage system is processed according to the locally variable FIR equalization technique. Comparing to FIG. 2B, the ON pixels of the image data in FIG. 2C have fewer variations in brightness. The process of imaging through a restricted aperture causes the pixels to be blurred as if by the application of a low-pass spatial filter upon the image field amplitude. The effect is most noticeable in the ON pixels because the varying noise contributions from the neighboring pixels add coherently with the ON signal itself, effectively multiplying the noise in intensity. The technique of channel linearization reverses this process of coherent noise multiplication so that the noise is approximately additive and of equal magnitude for both the ON and OFF pixels. Then, the technique of applying the FIR filter inverts the low-pass blurring process (i.e., the FIR filter is a high-pass equalizer) making the ON and OFF pixels levels less dependent on their neighbors. Furthermore, the technique of varying the FIR filter in accordance with local pixel alignment further improves the performance of the equalizer by restoring the pixel alignment (pixel misalignment being manifested as asymmetrical blur). As a result of these operations, the histograms of the ON and OFF pixels are made narrower and more distinguishable.

Figure 3A:
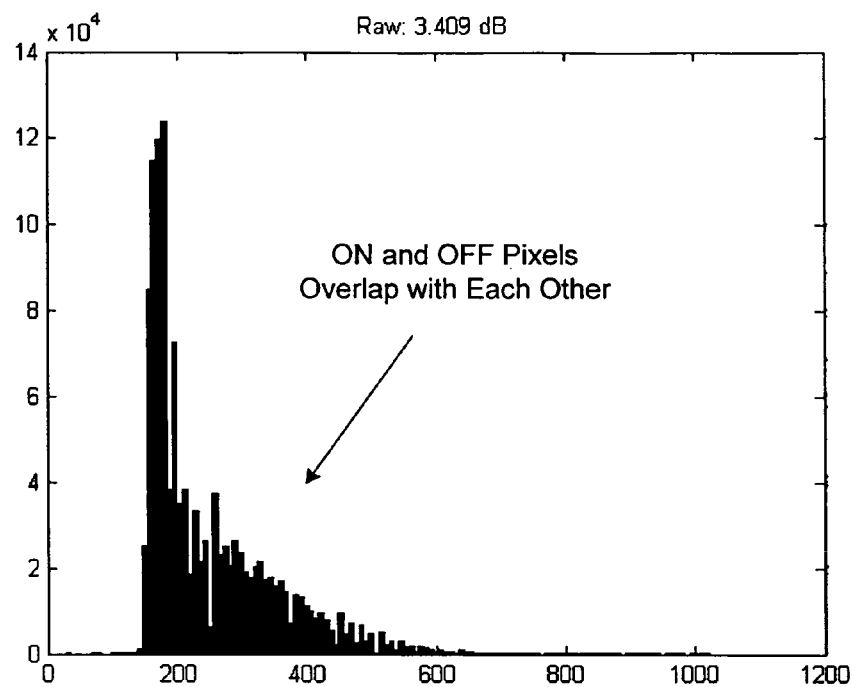
FIG. 3A is a histogram of the unprocessed pixel image data according to an embodiment of the present invention.
Figure 3B:
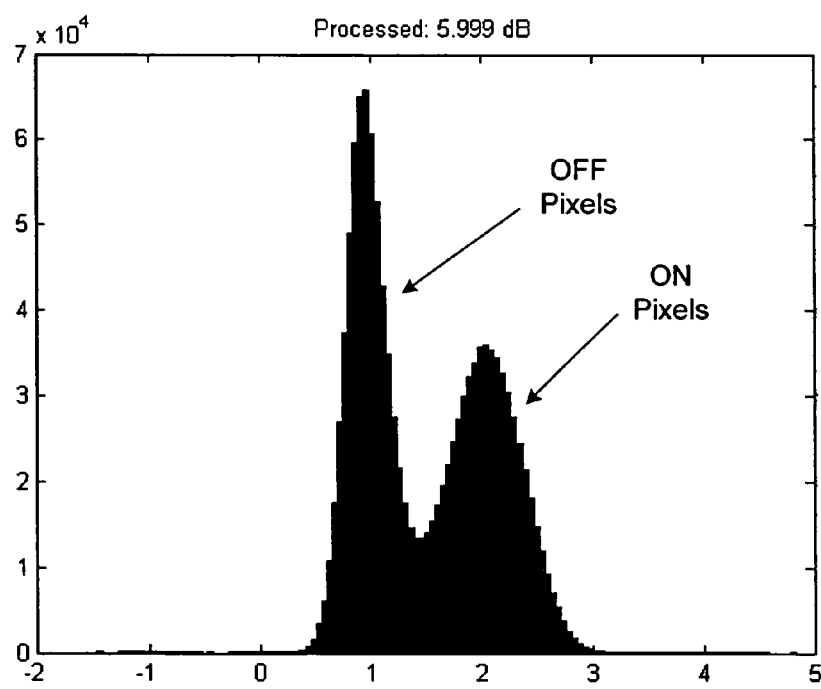
FIG. 3B is a histogram of the processed pixel image data after being processed according to an embodiment of the present invention.

FIGS. 3A and 3B further illustrate the benefits of the locally variable FIR equalization technique according to an embodiment of the present invention. FIG. 3A is a histogram of the unprocessed pixel image data according to an embodiment of the present invention. The vertical axis represents the number of pixels. The horizontal axis represents the pixel brightness at the detector 128. Without applying equalization, there are many variations in brightness of the ON pixels. The majority of the ON pixels have brightness values ranging from 250 to 500, but some ON pixels have brightness values ranges from 600 to over 1000. In this example, the SNR of the raw image data without applying equalization is about 3.409 dB. One of the problems of large variations in brightness of the ON pixels is that the ON pixels overlap with OFF pixels at the low end. Thus, no single threshold may be used to distinguish the ON pixels from the OFF pixels. This limitation results in a higher bit error rate in the holographic image page, which in turn reduces the storage density of the holographic data storage system.

FIG. 3B is a histogram of the processed pixel image data after being processed according to an embodiment of the present invention. The vertical axis represents the pixel count and the horizontal axis represents pixel brightness after equalization. As shown in FIG. 3B, majority the OFF pixels are centered on pixel brightness value of 1 and majority of the ON pixels are centered on pixel brightness value of 2. Thus, there is a clearer separation of the ON pixels and the OFF pixels. In this example, the SNR of the processed image area has improved to 5.999 dB from that of 3.409 dB as shown in FIG. 3A.

To improve the efficiency of the methods of linearization and equalization described above, special data pages may be used to simplify the procedure in determining the coefficients of the global PSF or the global FIR kernel. For example, a page consisting of many isolated pixels spread in known positions over the page may be used. In this context, an isolated pixel is a single ON pixel surrounded by nearest neighbors that are OFF pixels. Analysis of the recovered known pixel pattern for the spatial dependence of the PSF and linearization exponent is simplified because of reduced influence of adjacent pixels.

In addition, known pixel patterns may be employed as part of a calibration procedure for alignment when the holographic drive is first fabricated, and as part of a re-calibration procedure as the holographic drive drifts and ages, or after the holographic drive is subject to mechanical shock and vibration. Using pre-recorded known pixel holograms, the holographic drive may re-calibrate itself and update its filter parameters as needed.

Compensating Nonlinearity of the Holographic Data Storage Channel

As suggested in the background section above, a significant limiting factor on the performance of FIR filtering in relation to a coherent optical data channel is the inherent nonlinearity of the channel. This is because the FIR filtering is tuned to remove the effects of a pixel misalignment on its neighbors as best as possible within a linear regime. Thus, the nonlinearity of the holographic data storage channel needs to be compensated.

Figure 4A:
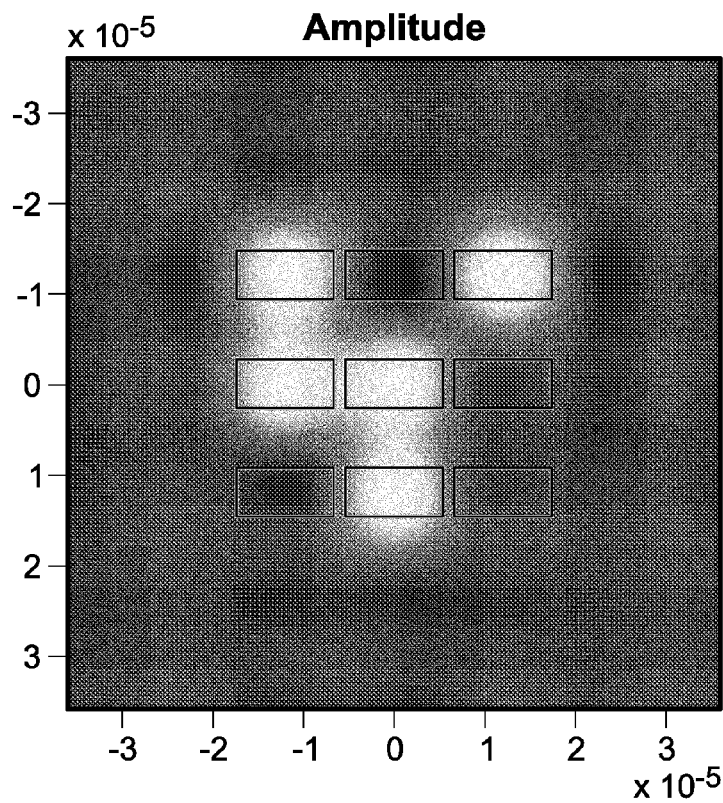
FIG. 4A illustrates a portion of a 3 pixel×3 pixel of an exemplary data image.
Figure 4B:
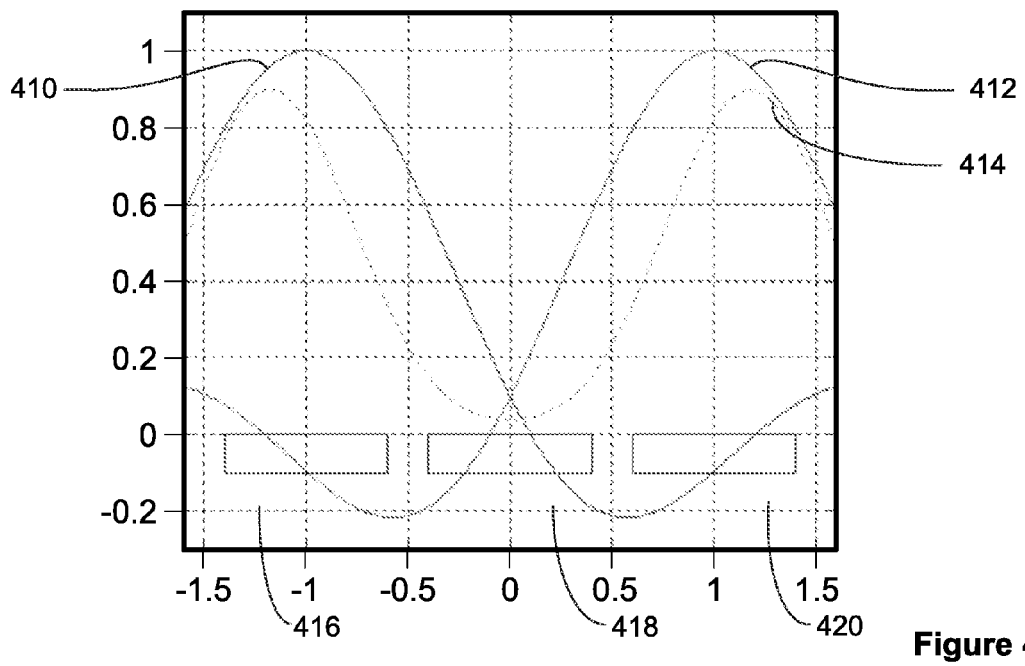
FIG. 4B illustrates an intensity profile resulting from adding and squaring the electric field strengths of pixels in the first row of FIG. 4A according to an embodiment of the present invention.

FIGS. 4A and 4B illustrate the nonlinearity of the holographic data storage channel. FIG. 4A illustrates a portion of a 3 pixel×3 pixel of an exemplary data image. Both the horizontal and vertical axes represent the dimensions of a pixel. An ON pixel is represented by a white spot and an OFF pixel is represented by a dark spot. The first row consists of ON/OFF/ON pixels; the second row consists of ON/ON/OFF pixels; and the third row consists of OFF/ON/OFF pixels. The brightness of a pixel represents the aggregated level of electric field strength squared at that pixel location. Additionally for some OFF pixels, the very dark colors represent electric field strength values inverted with respect to the electric field strength values of the ON pixels. As shown in FIG. 4A, the light of an ON pixel extends into its adjacent pixels thereby creating intersymbol interference. Such intersymbol interferences cause the holographic data storage system to be nonlinear.

FIG. 4B illustrates an intensity profile resulting from adding and squaring the electric field strengths of pixels in the first row of FIG. 4A according to an embodiment of the present invention. Note that as an example, only the intersymbol interference effect between pixels in the first row is shown in FIG. 4B. A person of ordinary skill in the art will recognize that the intersymbol interference effect between pixels form adjacent rows may be analyzed in a similar manner. The horizontal axis represents the distance between the pixels; and the vertical axis represents the electrical field strength of the ON pixels. The curve 410 represents the electric field strength profile over distance for the left ON pixel. The curve 412 represents the electric field strength profile over distance for the right ON pixel. The curve 414 represents the light intensity profile obtained by summing and squaring curves 410 and 412. The box 416 represents the size of the left pixel detector; the box 418 represents the size of the center pixel detector; and the box 420 represents the size of the right pixel detector.

Note that the electric field strength profile from the left ON pixel 410 affects the center OFF pixel as well as the right ON pixel 412. Similarly, the electric field strength profile from the right ON pixel 412 affects the center OFF pixel and the left ON pixel 410. As the image aperture is reduced, the electric field strength of an ON pixel blurs out and lands on the neighboring pixels. In addition, the electric field strength may be a negative value. In other words, the intersymbol interference from one neighbor pixel may not only add to the electric field strength of the neighbor pixel, it may also be subtracted from the neighbor pixel. This characteristic presents another problem to the presumption of a linear channel, which assumes the signal levels of neighbor pixels always add together, but do not subtract from each other.

In one embodiment, the raw signal is linearized by applying a linearization exponent ($\alpha$), to each detected pixel value. The linearization exponent is applied prior to an equalizing operation, such as the FIR filtering, which presumes linearity.

In this approach, the nonlinearity of the channel is measured according to a desired value of a metric corresponding to a desired data accuracy of the holographic data storage system. This approach assumes that the recording data are binary, having states 0 (OFF) and 1 (ON). The approach also assumes a global channel PSF h of finite extent, and that it has vertical and horizontal symmetry. For example, the global PSF h is of the form $$h = \begin{bmatrix} h_4 & h_3 & h_4 \\ h_2 & h_1 & h_2 \\ h_4 & h_3 & h_4 \end{bmatrix}.$$

Since h is presumed zero for all distances greater than one from the center, the intersymbol interferences (ISI) introduced by h into a given pixel is a function of the pixel and its eight immediate neighbors. If the channel is linear, Equation 2 may be used to represent the measured intensity level of a pixel in terms of the channel response and the 512 (i.e. $2^9$) possible states of the 3 by 3 neighbor pixels surrounding the central pixel as $$\begin{bmatrix} I_1 \\ I_2 \\ \vdots \\ I_{512} \end{bmatrix} = X \begin{bmatrix} h_1 \\ h_2 \\ h_3 \\ h_4 \end{bmatrix}. \qquad \text{(Eqn. 2)}$$

X is a 512 by 4 matrix, where each row contains the count of the respective terms in h that sum into the center pixel, and the signal intensity level vector I is a 512-element column vector containing the ideal linear intensity level of the center pixel.

In the case of a nonlinear channel, an actual signal intensity level vector I' of detector values taken over all 512 possible pixel neighborhood states may be obtained by either analytical or empirical methods. Then, a fitting error of the actual vector I' versus the ideal linear vector I may be defined as the least squares error (LSE) of signal intensity level as:

$$err_{LS} = \frac{|I - I'|}{|I|},$$

where $err_{LS}$ is used as a metric for adjusting channel linearity.

Given such a metric, the channel performance may be evaluated over a range of linearization exponent ($\alpha$), and a desired linearization exponent is selected that minimizes $err_{LS}$. In one specific implementation, the channel is simulated in the MatLab computer language incorporating the pixel fill factors, linearization exponent ($\alpha$), and the continuous imaging system point spread function. Using the least-squares fitting function represented by a backslash (\) in MatLab, the best fitting PSF h may be obtained, as well as the actual channel response I'. The corresponding linear I vector is created by solving Equation 2. Then, the metric $err_{LS}$ is computed by using I and I'.

Figure 5:
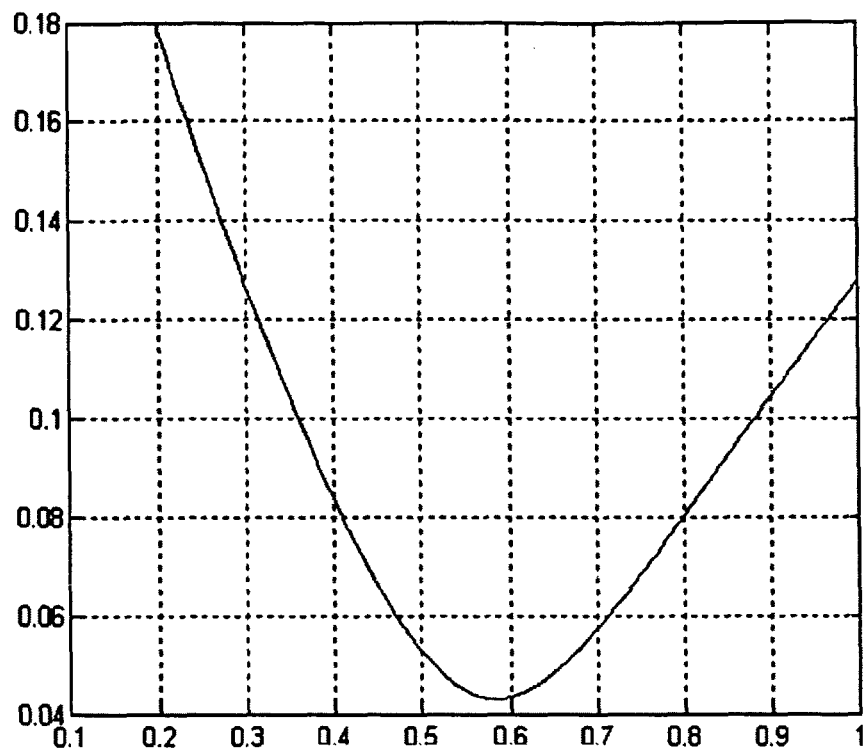
FIG. 5 illustrates a method for selecting a linearization exponent according to an embodiment of the present invention.

FIG. 5 illustrates a method for selecting a linearization exponent according to the method described above. The horizontal axis represents the linearization exponent value. The vertical axis represents the least square error errLS, a metric for measuring data accuracy of the holographic data storage channel. In this example, the best linearization exponent value α that generates the lowest $err_{LS}$ is about 0.58, with the corresponding local minimum of $err_{LS}$=0.043 (27.3 dB). For this exemplary holographic data storage system, when the linearization exponent decreases below 0.58, $err_{LS}$ increases; and when the linearization exponent increases above 0.58, $err_{LS}$ also increases. Note that the linearization exponent (α) may also be tuned to minimize the bit error rate (BER) of a holographic image page using the method described above.

In yet another embodiment, the linearization exponent (α) is optimized subject to a signal-to-noise ratio (SNR), as opposed to the least-squares fitting error of signal intensity level described above. The SNR of the measured values of pixel I' over the states of its neighboring pixels may be calculated. First, divide I' into a first set and a second set, where the first set has the center pixel equal to 1 and the second set has the center pixel equal to 0. Second, calculate the means ($\mu_1$ and $\mu_0$) for the 1's and 0's, respectively. Third, calculate the standard deviations ($\sigma_1$ and $\sigma_0$) for the 1's and 0's, respectively. An ISI limited SNR may then be computed by Equation 3 as $$SNR_{ISI} = \frac{\mu_1 - \mu_0}{\sigma_1 + \sigma_0}. \quad \text{(Eqn. 3)}$$

This SNR only considers noise that is caused by intersymbol interference and therefore it is ISI limited. However, in other embodiments, other sources of noise, for example coherently additive optical noise or detector response variation, may be incorporated into the noise denominator. In addition, alternate definitions of SNR, for example adding root-mean-square noise terms, may be used without departing from the spirit and scope of the invention. Further, the SNR may be calculated from formulae similar to Equation 3 over empirical data collected from actual holograms or from a representative optical imaging system. Furthermore, Equation 2 will have a different form if different assumptions about the size, shape, and symmetry of the global PSF are used. Finally, the metric for optimizing the linearization exponent (α) may be derived from the corrected bit error rate at the output or other points in the holographic data storage channel. The bit error rate may be determined analytically or empirically.

Figure 6:
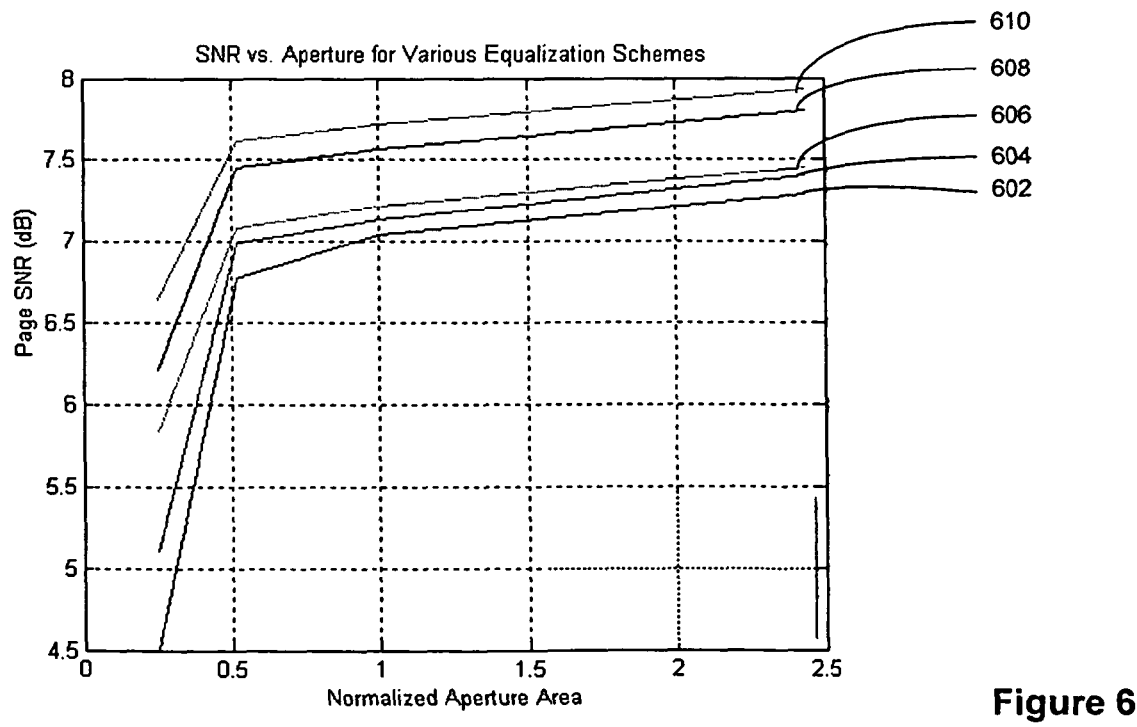
FIG. 6 compares the signal-to-noise ratio versus imaging aperture according to the various equalization schemes discussed.

FIG. 6 compares the signal-to-noise ratio versus imaging aperture according to the various equalization schemes discussed. The figure illustrates improvements of the inventive techniques of equalization and linearization in terms of signal-to-noise ratio over the prior art. The horizontal axis represents an area of the imaging aperture, which determines the PSF of the system. The vertical axis represents the signal-to-noise ratio of the data pages. Curve 602 shows the signal-to-noise ratio of the output image without any equalization or linearization. Curve 604 shows the signal-to-noise ratio achieved by applying a linearization exponent α=0.58. Curve 606 shows the effect of filtering a linearized page with a global w kernel determined from the measured PSF by the prior-art method of zero-forcing equalizer. Curve 608 shows the improvement obtained from taking the same global w kernel in curve 606 and modifying it locally in each local image region according to the corresponding measured pixel alignment error of each local image region. Finally, curve 610 shows the improvement obtained from a second iteration by applying the locally variable FIR equalization technique again to the curve 608. As shown in FIG. 6, the inventive methods of linearization and equalization achieve a higher SNR compared to the prior art methods.

The left-most set of data points shows the effects of each scheme at the Nyquist aperture, which is the smallest aperture (and therefore the highest storage density) that adequately samples the information of the data page according to the Nyquist criterion. This configuration also has the widest PSF, and therefore has the most to gain by the method of ISI removal. Thus, the method enables a user to optimize the storage density of the holographic data storage system by choosing a smaller imaging aperture to meet a specific SNR design criteria.

In a different embodiment, a joint iteration method is applied to establish a set of parameters that optimize the performance of the holographic data storage system. In this approach, the set of parameters are iteratively optimized by empirically evaluating their impact on a performance metric such as SNR, $err_{LS}$, or bit error rate. In one specific example of the joint iteration method, the set of parameters α, $a_x$, $a_y$, $w_{11}$, and $w_{12}$ are tuned iteratively to improve the performance of the holographic image storage system. Initially, the set of parameters are initialized with certain predetermined values, for example α=$a_x$=$a_y$=1, and $w_{11}$=$w_{12}$=-1/10. One or more holographic data images are linearized, equalized, and decoded according to the methods discussed above. (Note that the entire FIR kernel, w, is generated from $w_{11}$ and $w_{12}$ by assuming $w_{22}$ is a one, and that the 3×3 matrix has diagonal and rectangular symmetry.) Next, the decoded image is compared to the original image, and an actual, initial bit error rate is established. Then, an incremental change is made to the first parameter, α (say, incrementing it by 1/10), and the bit error rate is re-evaluated. If the new bit error rate is lower (better) than the initial bit error rate, then new value of α is kept for subsequent iterations; otherwise the old value of α is kept.

This process is repeated with each of the other parameters ($a_x$, $a_y$, $w_{11}$, and $w_{12}$) to complete the first iteration. Then, the whole process is repeated in subsequent iterations, with each parameter being adjusted (incremented or decremented) by from its last, best known value at each iteration. The direction of the adjustment for each parameter may be alternated, and the magnitude may be shrunk whenever an iteration fails to produce an improvement (e.g., if decrementing $a_x$ by 1/10 fails to improve the bit error rate, then it will be incremented by 9/100 on the next iteration). The set of parameters (α, $a_x$, $a_y$, $w_{11}$, and $w_{12}$) may converge to values that jointly produce a local minimum value for bit error rate after a number of iterations. When each iteration produces only a negligible change in the overall bit error rate, the procedure is deemed to have converged and the final values of the free parameters are recorded.

Note that the joint iterative method described above is independent of how each individual parameter is obtained. For example, the zero-forcing method may be employed to determine the FIR coefficients, w, from a given pixel spread function, h; or the LMMSE method may be employed to determine w directly from instantiations of the (unequalized) channel response.

Resampling Method

In one embodiment, an estimate of the state of each data pixel is obtained using only the detector elements in a local window corresponding to the position of the data pixel image upon the detector. Furthermore, the estimation function is linear, except that a "linearization" exponent is applied to each detector value in order to partially compensate for the non-linear coherent addition of neighboring data pixel images.

Figure 7:
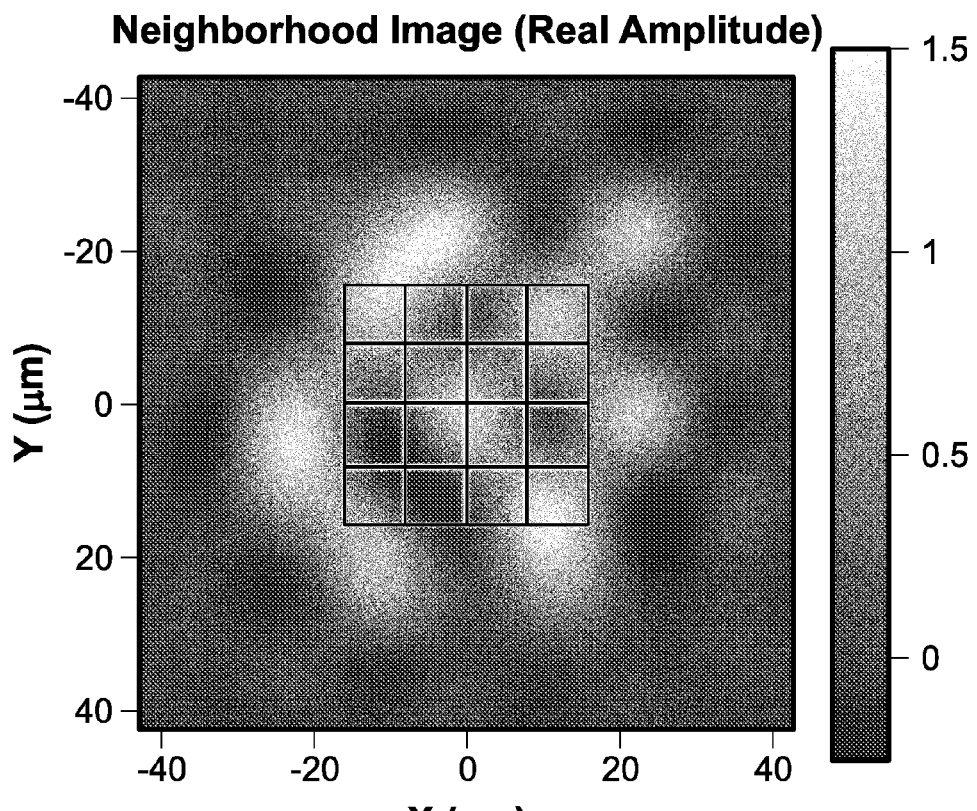
FIG. 7 illustrates a simulated neighborhood of data pixel images according to an embodiment of the present invention.

For purposes of illustration, the dimensions of the local detector window chosen for the results in the embodiments of the present disclosure are four by four pixels. This choice represents a trade-off between computational complexity and performance. The linear oversampling ratio is defined as the data pixel image spacing divided by the detector element spacing. For moderate levels of oversampling, a four by four detector window captures substantially all of the data pixel image energy for every possible local alignment of the detector window to the data pixel image. A four by four window also captures a substantial part of the neighboring data pixel images, thus conveying information about the intersymbol interference (ISI) that affects the data pixel image of interest. Furthermore, it becomes apparent that the worst case for local alignment occurs when the center of the data pixel image lands squarely between detector pixels (fractional alignment $\delta_X = \delta_Y = \frac{1}{2}$). Since this case dominates performance, it is appropriate to choose a window size that is symmetric about the data pixel image in the worst case—i.e., an even number of window pixels—rather than one that is symmetric for the locally pixel-matched $\delta_X = \delta_Y = 0$ case (which would call for an odd-sized window). FIG. 7 illustrates a simulated neighborhood of data pixel images according to an embodiment of the present invention. It has an overlay outlining the active areas of the four by four detector pixel window aligned to the center data pixel image in the $\delta_X = \delta_Y = \frac{1}{2}$ worst case.

Given knowledge of the data pixel image position with respect to the detector array, the integer part of the position is used to select the closest four by four detector pixel window. A set of linear coefficients, $w_i = [w_1 \ldots w_{16}]$, is required in order to estimate the state of the center data pixel image from the 16 detector pixel values. However, since the four by four pixel window may have an arbitrary fractional alignment to the data pixel image, a single set of coefficients may not perform this task optimally. The solution to this is to select a different set of coefficients for each possible fractional alignment. Results presented here utilize coefficients optimized for fractional alignments $\delta_X$, $\delta_Y$ in increments of 5% of the detector pixel spacing in both the x and y directions. This results in a table of size of 441 (21×21) different $w_i$ coefficient sets.

Given the preceding algorithmic approach, the actual $w_i$ coefficients can be determined by a variety of methods. One standard approach to this type of problem is to use a minimum mean-squared-error optimization criterion. In this method, the coefficients are selected to minimize the norm of the output error over a large set of input data. Define $I_i = [I_1 \ldots I_{16}]$ to be the measured or simulated detector value vector from the detector pixel window, and d to be the state of the data pixel image to be determined (for binary amplitude modulated data, d would be either a zero or a one). The output estimate $\hat{d}$ of the data state d is the inner product of the detector vector and the coefficients, $\hat{d} = I_i \cdot w_i$, and has an associated error $\hat{d} - d$. The same 16 $w_i$ coefficients are applied to any set of detector values that might appear in the detector window, so the error are minimized over a large number, n, of detector window vectors and associated data states. The problem may be stated compactly in matrix form:

$$\begin{bmatrix} \hat{d}_1 \\ \hat{d}_2 \\ \vdots \\ \hat{d}_n \end{bmatrix} = \begin{bmatrix} I_{1,1} & I_{1,2} & \cdots & I_{1,16} \\ I_{2,1} & & & \\ \vdots & & \ddots & \\ I_{n,1} & & & I_{n,16} \end{bmatrix} \begin{bmatrix} w_1 \\ w_2 \\ \vdots \\ w_{16} \end{bmatrix} \text{ where } \|d_i - \hat{d}_i\| \text{ is minimized}$$

Procedures for solving such a system of equations are described by M. Keskinoz, et al., in "Application of linear minimum mean-squared-error equalization for volume holographic data storage," *Appl. Opt.* 38, pp. 4387-4393, 1999, which is incorporated herein in its entirety by reference. For the results shown below, coefficients are derived over n=1024 different simulated detector window vectors. The simulation is performed by assigning a binary value to each of the data pixels in a 5×5 neighborhood with the target data pixel, d, in the center (the inner 3×3 pixels are systematically swept through all 512 possible states twice, while the outer ring of pixel states are assigned values pseudo-randomly). A simulated SLM neighborhood (32×32 samples per pixel, 90% areal fill factor) is populated with the binary values and numerically propagated through a square aperture of small width, for example approximately 1.08 times Nyquist, in order to simulate the ISI. The modulus-squared of the resulting simulated field is then numerically integrated over the active areas of the 16 detector elements comprising the detector pixel window (also 90% areal fill factor). Pseudorandom coherent noise with power σ=0.05 of an ON pixel is added to each detected value.

Upon collecting data for all 1024 neighborhood pixels, the 16 coefficients $w_i$ and the 1024 data state estimates $\hat{d}_j$ are determined. Additionally, for binary $d_i$, a signal-to-noise-ratio (SNR) performance metric for the coefficients may be defined as:

$$Q = \frac{\mu_1 - \mu_0}{\sigma_1 + \sigma_0},$$

where $\mu_1$ and $\mu_0$ are the means of ones and zeros of the $\hat{d}_i$ corresponding to $d_i$; and $\sigma_1$ and $\sigma_0$ are the respective standard deviations.

Figure 8:
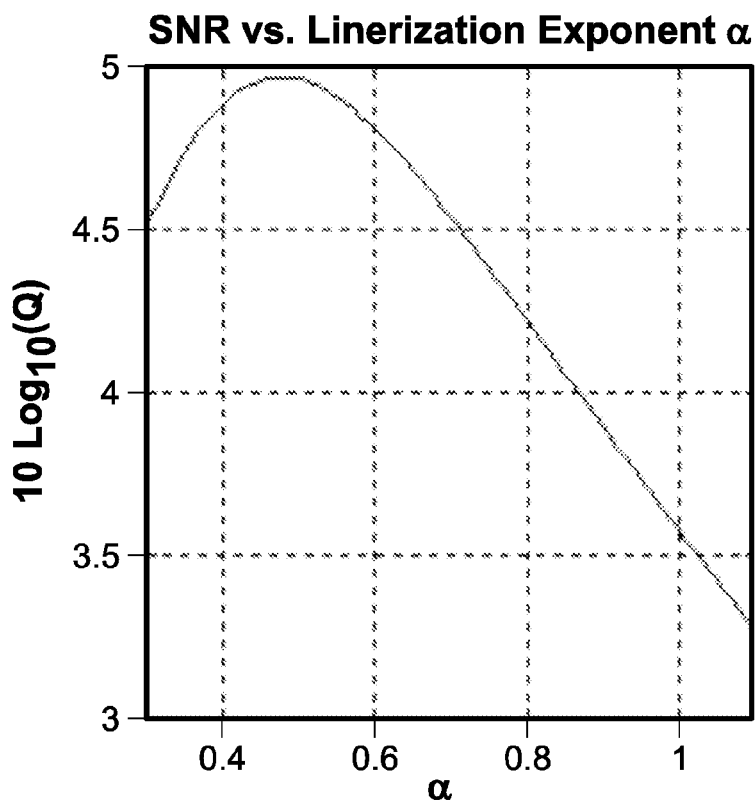
FIG. 8 illustrates simulated signal-to-noise ratio (SNR) improvements from linearization according to an embodiment of the present invention.

One factor that limits the performance of a linear equalization scheme in a holographic data channel is that the underlying physics are linear in electromagnetic field strength, but not in irradiance. V. Vadde and B. Kumar in "Channel modeling and estimation for intrapage equalization in pixel-matched volume holographic data storage," *Appl. Opt.* 38, pp. 4374-4386, 1999, have demonstrated that in some cases, an otherwise linear channel model that operates on the positive square root of the detected optical powers performs quantitatively better than a model using the detector values directly. The former case, also referred to as the magnitude model (for α=0.5), represents an expedient compromise since phase information is clearly destroyed in the square root operation. Nevertheless, the arrangement of the present system lends itself to the magnitude model since a near-Nyquist aperture has the effect of forcing the primary, nearest-neighbor component of the ISI to be constructive in phase with respect to the signal (barring any other phase alterations). The Q metric (a measurement of signal-to-noise ratio) presents the opportunity to quantify the performance of the present linear resampling method under both the magnitude model and the direct intensity model (for α=1.0). Furthermore, linearization exponents, α, can be tested for cases other than the magnitude model and the intensity model. FIG. 8 illustrates simulated SNR improvements from linearization according to an embodiment of the present invention. The results of applying α exponents are shown in the range of 0.3 to 1.1 for the $\delta_X=\delta_Y2=\frac{1}{2}$ alignment case with a 4/3 linear oversampling ratio.

As expected, the Q metric peak occurs when α is much closer to 0.5 than to 1.0, with the actual peak at approximately α=0.53, indicating that the magnitude model is more appropriate than the intensity model for this configuration. For subsequent results, $w_i$ coefficients that are derived using the magnitude model (α=0.5) are used.

Note that the operation of the present resampling method includes the removal of ISI. K. Chugg, et al., in "Two-dimensional equalization in coherent and incoherent page-oriented optical memory," *J. Opt. Soc. Am. A* 16, pp. 549-562 (1999), and J. Heanue et al. in "Signal detection for page-access optical memories with intersymbol interference," *Appl. Opt.* 35, pp. 2431-2438 (1996), both of which are incorporated herein in their entirety by reference, have described equalization strategies for ISI reduction in pixel-matched systems. In one scheme, an ISI-removal equalizer includes a linear FIR filter with, for example, 3×3 coefficients. The coefficients may be selected to invert a predetermined blur function ("zero-forcing" equalization) or linear minimum mean-squared-error (LMMSE equalization). ISI is especially severe in the small aperture, lower SNR imaging regime such as that of primary interest here.

In the resampling method, basic linear ISI equalization is built into the resampling process. This is because the $w_i$ coefficients are optimized to output the state (e.g., 0 or 1) of the data pixel image, rather than reconstructing the actual optical power impinging at the pixel position, which varies depending on the state of neighboring data pixels. This has the effect of driving the covariance between neighboring data pixel estimates towards zero, hence removing ISI. Normally, the goal of a resampling algorithm is to interpolate the desired sampling positions in order to represent an underlying continuous signal with the highest fidelity possible, as described in "A flexible sampling-rate conversion method," by J. Smith, et al., in *Proc. IEEE Int. Conf: Acoustic Speech Signal Processing* 2, 19.4.1-19.4.4 (1984), which is incorporated herein in its entirety by reference. Here, the goal of resampling is viewed as a linear interpolation filter cascaded with a linear ISI equalizer. In an alternative embodiment, the resampling algorithm interpolates the underlying signal intensity of the pixel.

Figure 9:
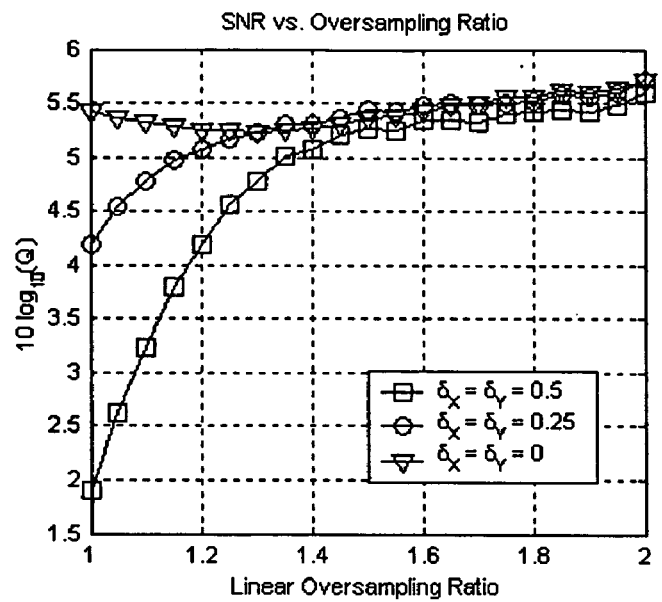
FIG. 9 illustrates simulated effects of linear oversampling according to an embodiment of the present invention.

The model described above is used to explore the effects of parameter changes. FIG. 9 illustrates simulated effects of linear oversampling on the Q metric according to an embodiment of the present invention. The horizontal axis indicates the linear oversampling ratio and the vertical axis indicates a $\log_{10}$ of the Q metric. The square-curve illustrates the case when $\delta_X=\delta_Y=0.5$; the circle-curve illustrates the case when $\delta_X=\delta_Y=0.25$; and the triangle-curve illustrates the case when $\delta_X=\delta_Y=0$.

As shown in FIG. 9, the steep improvement for the poorly aligned case ($\delta_X=\delta_Y=0.5$) as the oversampling ratio increases from unity demonstrates the benefit of this approach for relatively small oversampling ratios. Similarly, the decrease in steepness of the curve near the Nyquist rate of the irradiance pattern (oversampling ratio approximately equals to 2) demonstrates the low marginal utility of increasing the oversampling ratio to that level. These observations are consistent with the previous discussion concerning the spectral content of the irradiance pattern.

FIG. 9 also shows the simulated performance level of a perfectly pixel-matched system, including minimum mean-squared-error ISI equalization based on the 4×4 detector pixel window. This provides the data point for the $\delta_X=\delta_Y=0$ curve at an oversampling ratio of one. The simulated results indicate that lower levels of oversampling (for example <1.8) perform at a slight deficit relative to this ideal level.

Figure 10:
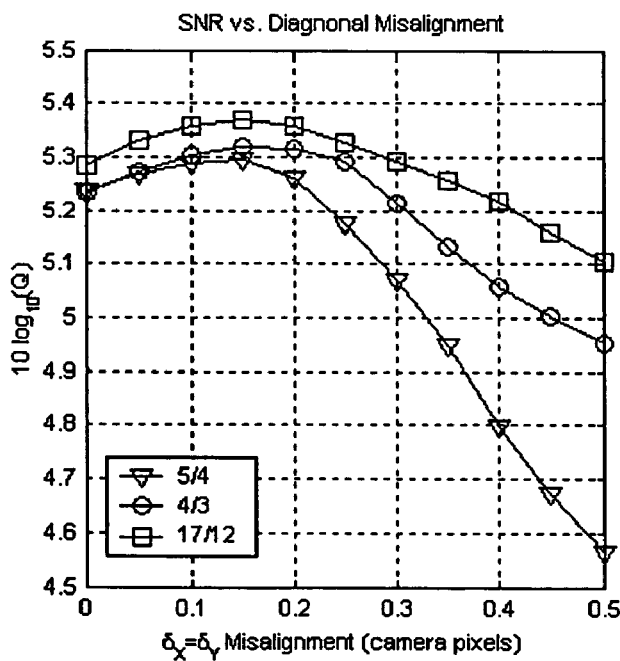
FIG. 10 illustrates simulated effects of SNR versus local pixel misalignment for different oversampling ratios according to an embodiment of the present invention.

FIG. 10 illustrates simulated effects of SNR versus local pixel misalignment for different oversampling ratios according to an embodiment of the present invention. The horizontal axis indicates the misalignment of the detector (camera) pixels and the vertical axis indicates a logo of the Q metric. The square-curve illustrates the case where the oversampling ratio is 17/12; the circle-curve illustrates the case where the oversampling ratio is 4/3; and the triangle-curve illustrates the case where the oversampling ratio is 5/4. As discussed previously, the $\delta_X=\delta_Y=\frac{1}{2}$ case is the worst of all ratios. Also note that $\delta_X=\delta_Y=0$ is not the best case, since the 4×4 window is highly asymmetric about the data pixel image. When 4×4 window is centered on detector pixel (2, 2), there is a small advantage by shifting the window slightly to the upper left. All ratios perform well where the detector is locally aligned to the data pixel image, but with the lowest ratio, the penalty for misalignment is very steep. A ratio of 4/3 is sufficient to keep the SNR variation due to local alignment under 0.4 dB.

The choice of an oversampling ratio hinges on a trade-off between performance and the cost and complexity of the system. It is important to note that the total number of detector elements required goes up as the square of the oversampling ratio. Holographic storage may support very high data rates because of the parallel nature of the read-out. In order to achieve this high data rate, however, the detector and the read channel logic need to operate at a much higher data rate, even for the case of a pixel-matched system. Note that for consumer applications where high data rate is not required, minimizing the oversampling ratio can be critical for cost, size, and power benefits. Practical design considerations place a high premium on keeping the oversampling ratio as low as possible.

In one embodiment, a holographic data storage system is constructed to implement an alignment measurement method using an SLM with 12 μm pixels and a detector with 9 μm pixels yielding an oversampling ratio of 4/3. Subsequent results shown below are based on this configuration.

Alignment Measurement Method

The foregoing discussion presumes the availability of accurate $\delta_X$, $\delta_Y$ alignment information for each and every data pixel image. The alignment data should be accurate to within the $w_i$ coefficient marginal sensitivity to alignment measurement error in order to avoid undue degradation of the resampling calculations. This requires accuracy on the order of a few microns for the parameters of the holographic data storage system.

In addition to the accuracy requirements, the alignment measurement method should be designed to minimize the proportion of recorded pixels set aside for alignment fiducials. Alignment demodulation should not incur an excessive computational cost. Finally, it is extremely robust. Failure to adequately determine alignment will render recorded data unrecoverable.

A desirable feature of the alignment measurement method is the ability to account for image distortions. In one approach, a two-fiducial method (or perhaps four, one in each corner of the data image) is devised to measure translation, rotation, and magnification of an otherwise rectilinear image grid.

The page recording format includes reserved blocks, which are small regions of known pixel patterns that are distributed throughout the recorded data page. The reserved blocks contain data-like pseudo-random bit patterns. In this approach, the reserved blocks are 8×8 pixel blocks distributed on a grid at a spacing of 64 pixels in both the x and y directions, which carries a nominal areal overhead of 1.6%.

The reserved blocks serve as fiducials for alignment measurement. The alignment demodulation algorithm conceptually resembles a pattern-matching operation or more specifically a covariance calculation. The alignment demodulation algorithm compares regions of the detector array to the known reserved block (target) pattern. The covariance is calculated at each of several discrete detector pixel array locations in order to resolve and isolate a peak corresponding to that integer location where the detector pattern most strongly matches the reserved block pattern. The final, fractional-pixel demodulated alignment is derived by linearly interpolating between the peak value and its nearest horizontal and vertical (x, y) neighbors.

However, there are two issues that need to be addressed with this scheme. For example, while the expected strength of the peak in the pixel-matched case is determined mainly by the norms of the two patterns, the covariance of the neighboring locations depends strongly on the specific pixel pattern of the reserved block, as well as that of the neighboring data. In the former instance, a non-zero covariance of a reserved block pattern with a pixel-shifted version of itself injects an autocorrelation noise into the demodulated position; while the latter situation creates data noise.

In one approach, the solution to counter these two issues is two-fold. First, in order to prevent neighboring data pixels from impacting the alignment measurement, the covariance is calculated over an interior region of the reserved block pattern sufficiently small that no neighboring data enters the computation window when the nearest neighbors of the peak are computed. For instance, for 8×8 pixel reserved blocks with oversampling ratio of 1, the inner 6×6 pixel sub-block may be used as a target pattern since it may be shifted by ±1 pixel in any direction without overlapping any region outside the original 8×8 block. This condition is sufficient to prevent data noise from influencing the covariance values near the peak.

Secondly, autocorrelation noise can be eliminated or substantially reduced by selecting specific pixel patterns within the reserved block. In the above example, an 8×8 pixel binary reserved block pattern is designed such that the covariance of the inner 6×6 pixel sub-block with any of the other eight edge-bordering 6×6 pixel sub-blocks is zero. In other words, the inner 6×6 sub-block has half of its pixel states in common with its eight neighboring sub-blocks, and the other half of its pixel states being different from its eight neighboring sub-blocks. In this circumstance, the contribution of autocorrelation noise to the covariance values neighboring the peak goes to zero.

Thus, an autocorrelation-equalized reserved block pattern still retains the character of pseudo-random data, but it may be used as a fiducial for highly accurate alignment demodulation. Note that by forcing the autocorrelation of the reserved block pattern to more closely resemble a delta function, its power spectral density (which is the Fourier transform of the autocorrelation) becomes more uniform. Autocorrelation-equalizing thus has the effect of "whitening" the reserved block. In this example, a long list of autocorrelation-equalized reserved block patterns is generated by computer search. In addition to the described covariance properties, the reserved block patterns are forced to have inverse odd symmetry (i.e., each pixel state is the complement of the state of the pixel opposite the reserved block center). This condition guarantees that both the inner 6×6 pixel sub-block and the whole 8×8 pixel reserved block have an equal number of ones and zeros.

Figure 11:
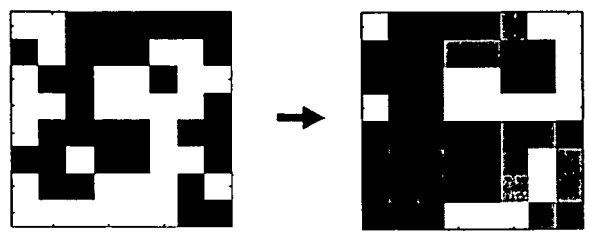
FIG. 11 illustrates a method for creating a target pattern by oversampling a portion of a reserved block according to an embodiment of the present invention.

The picture is more complicated when a non-unitary oversampling ratio is considered. In this case, even for binary data image modulation, the detector array may not see an image that is binary in value. For this reason, the target pattern used for the covariances is a resampled version of the reserved block interior, rather than the binary reserved block pattern itself. There are several possible approaches, such as a detailed simulation of diffraction, noise, and detector alignment that can be used in order to determine an optimal oversampled target pattern. In one approach, the following steps are taken: 1) a binary grid is created representing the original reserved block pattern; 2) the size of the largest integral interior region of detector pixels that may be chosen without introducing data noise is determined; and 3) the target pattern is generated by superimposing the oversampled detector pixel array on the center of the reserved block pattern, and numerically integrating the signal within each of the detector elements. Note that for the 4/3 oversampling example this is an 8×8 detector pixel array, which overlays the interior 6×6 pixels of the reserved block image. Also note that the effects of diffraction and pixel fill-factors are ignored. FIG. 11 illustrates a method for creating a target pattern by oversampling a portion of a reserved block according to an embodiment of the present invention.

To simulate the alignment demodulation process, a 12×12 pixel neighborhood of SLM pixels containing a reserved block pattern is numerically propagated through a Nyquist aperture size of approximately 1.08 and detected by numerically integrating over the active areas of a 12×12 pixel detector array. Coherent optical noise is optionally added, and the α linearization exponent is applied. The position of the detector array is varied in order to test different detector alignment cases, and the alignment demodulation algorithm is applied to the resulting simulated detector values. Note that the above simulation process is substantially similar to the previously described resampling simulation.

The covariances are then calculated from the simulated detector array values and the oversampled target pattern. For example, for the case of 4/3 oversampling where the target pattern is an 8×8 matrix, 25 valid covariance values may be calculated according to $$cov(\Delta r, \Delta c) \equiv \sum_{i=1}^{8}\sum_{j=1}^{8}[c(i+\Delta r+2, j+\Delta c+2)-\mu_c][t(i,j)-\mu_t],$$

where $\Delta r$ and $\Delta c$ are the covariance pattern matching positions relative to the center of the 12×12 detector array ($-2 \leq \Delta r, \Delta c \leq +2$); $c(i,j)$ and $t(i,j)$ are the $i^{th}$, $j^{th}$ linearized detector value and target pattern value; and $\mu_c$ and $\mu_t$ are the means of the detector pattern and target pattern respectively. The maximum covariance value (the peak), $cov(\Delta r_{max}, \Delta c_{max})$, is determined, and the estimated row alignment is determined from the modified centroid ($\beta$) functions:

$$\Delta \hat{r} = \frac{\sum_{i=-1}^{1} (\Delta r_{max} - i\beta) cov(\Delta r_{max} - i, \Delta c_{max})}{\sum_{i=-1}^{1} cov(\Delta r_{max} - i, \Delta c_{max})},$$

in the case when neither row neighbor is greater than a threshold ($\tau$) times the peak value, or $$\Delta \hat{r} = \frac{\sum_{i=0}^{1} \left(\Delta r_{max} - i\beta + \frac{1}{2}\right) cov(\Delta r_{max} - i, \Delta c_{max})}{\sum_{i=-1}^{1} cov(\Delta r_{max} - i, \Delta c_{max})},$$

when row neighbor $cov(\Delta r_{max}-1, \Delta c_{max})$ is greater than $\tau$ times as large as the peak. The case where $cov(\Delta r_{max}+1, \Delta c_{max})$ is greater than $\tau$ times the peak is handled similarly. Note that the low-noise situation, where both neighbors are greater than $\tau$ times the peak, is treated as an exception. The column alignment $\Delta \hat{c}$ is determined in a manner analogous to the row alignment.

The threshold $\tau$ that determines the crossover point between three- versus two-sample interpolation is empirically established from the simulation, as is the centroid scaling factor ($\beta$). The values used for these parameters are $\tau=3/4$ and $\beta=1.4$. Note that while the crossover threshold is established empirically, the underlying need for different interpolation methods is driven by the potential introduction of auto-correlation noise into covariance samples outside the centroid windows.

Figure 12:
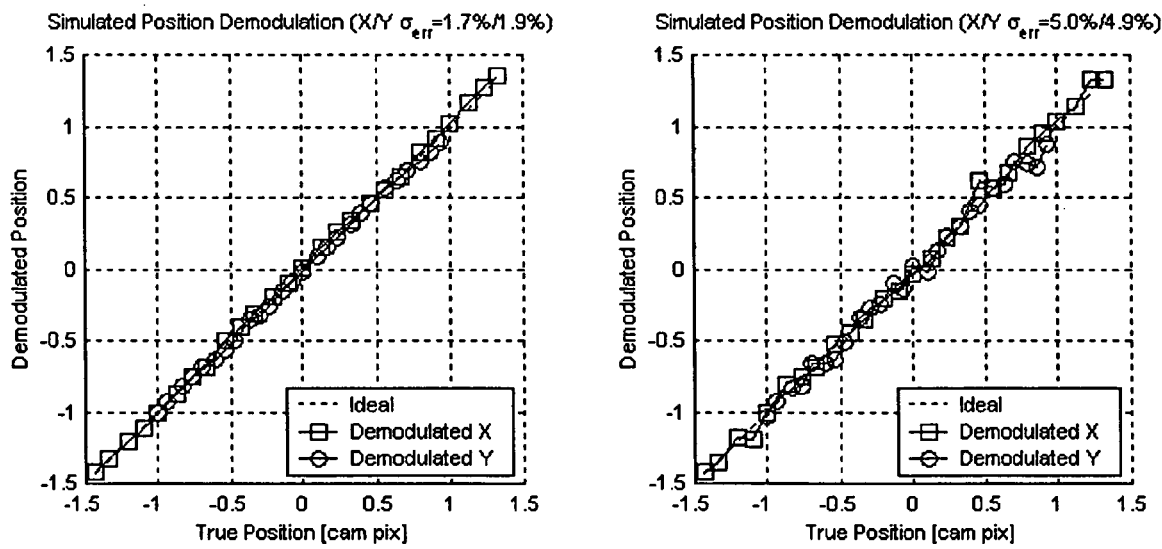
FIG. 12 illustrates simulated position demodulation according to an embodiment of the present invention.

The interpolation method is validated by the results of the simulation. FIG. 12 illustrates simulated position demodulation according to an embodiment of the present invention. The horizontal axis indicates the true detector (camera) pixel position and the vertical axis indicates the demodulated position. The dotted-curve illustrates an ideal case; the square-curve illustrates the case of a demodulated x; and the circle-curve illustrates the case of a demodulated y. As shown in FIG. 12, the results of a simulation wherein the true x, y alignment is swept from −1.5, −1.0 to +1.5, +1.0 (camera pixels).

The standard deviation of the position demodulation error is about 1.8% of a detector element spacing in the noise free case, but rises to 5.0% when a realistic minimal amount of coherent optical noise is injected into the signals. This observation indicates that optical noise is likely to dominate the accuracy of the system in practice, and there is little incentive to complicate the method by introducing a more analytical form of interpolation.

Calculating each individual covariance value represents a significant computational cost, so there is an incentive to minimize the number of values required. However, for an arbitrarily aligned data page, a large search range may be required in order to find the peak. Furthermore, the larger the area searched, the higher the chances of identifying a false peak within the random data. For these reasons, it is desirable that a coarse alignment method be employed.

In one approach, the size of the covariance matrix that covers the tolerance of coarse alignment is determined by reading barcodes on the edges of the page. In another approach, the coarse alignment is done by computing a large (41 by 41 pixel) covariance matrix on a predetermined set of the reserved blocks in a data page. In another embodiment, the algorithm can be optimized so that the average number of covariances per reserved block is less than six or eight. (Recall that only three, four, or five values are actually needed, depending on the local alignment of the reserved block). In this case, then the computational burden of alignment demodulation should be dominated by the 64 multiply-and-accumulate operations needed for each covariance. This, in turn, is dwarfed by the approximately 64,000 multiply-and-accumulate operations required to resample the associated region.

The described alignment demodulation method produces a map of the absolute position of the center of each reserved block image upon the detector. The oversampling algorithm requires that this map be interpolated to every data pixel image position. For purposes of interpolation, the sampled absolute positions are divided into two components, a nominal position and an offset from the nominal position. In this form, the nominal position is simply a grid of x, y vectors with a sample spacing equal to the reserved block spacing times the oversampling ratio.

It is possible that the raw reserved block alignment offset map may have missing or erroneous vectors, which cause it to be unsuitable for generating the interpolated data pixel image map. A robust system simply cannot rely on having every reserved block pattern recognized and located accurately. For this reason, a filtering operation is performed on the raw reserved block offset map.

Figure 13:
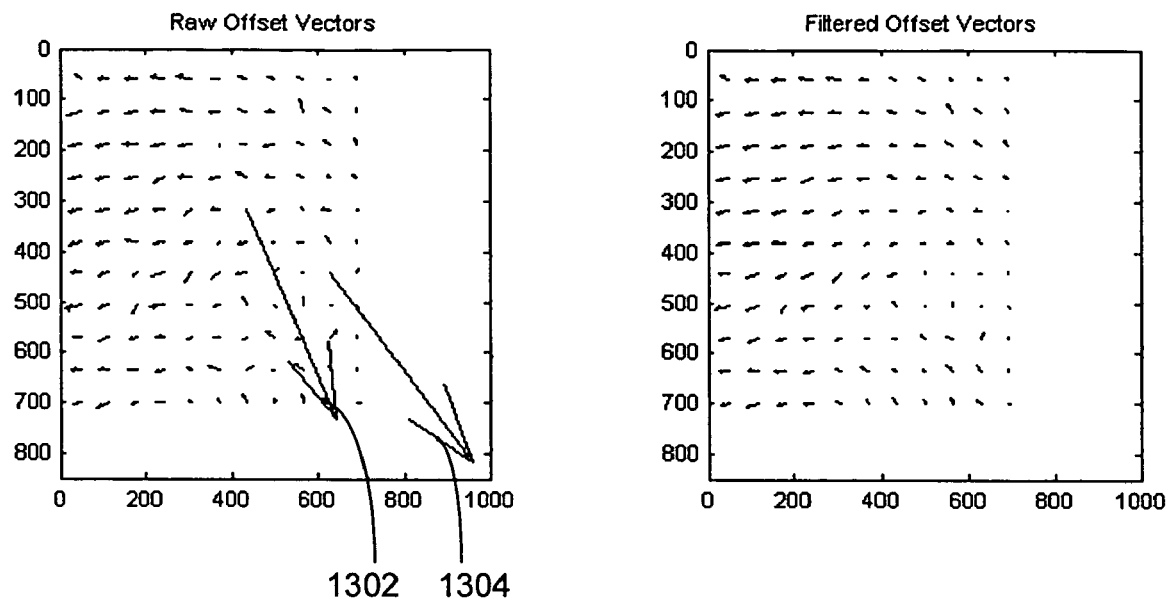
FIG. 13 illustrates effects of filtering a reserved block offset vector map according to an embodiment of the present invention.

The filtering is performed in three passes. In the first pass, each offset vector is compared to its immediate neighbors (eight of them in the map interior, five or three for edges and corners). If either the x or y component of the offset vectors differ by more than a fixed threshold (0.5 detector pixels, for the demonstration unit), then the two vectors are said to "disagree." Any vector that disagrees with more than half of its neighbors is flagged as an invalid vector. (Recall that there may already be invalid vectors in the map due to demodulation exceptions.) In the second pass, all of the invalid vectors are replaced with their neighbor averages. In the third optional pass, the map is filtered with a 3×3 kernel to effect low-pass smoothing. FIG. 13 illustrates effects of filtering a reserved block offset vector map according to an embodiment of the present invention. Each arrow represents the local offset of a reserved block. The two "fliers" 1302 and 1304, or incongruous arrows, are rejected by the filtering process.

The filtered offset vector map is, finally, linearly interpolated to generate an offset map for each data pixel image location. The data pixel offsets are added to the nominal data pixel positions to determine the absolute position of each data pixel image. The resampling algorithm then uses the integer part of the absolute position to determine the closest 4×4 detector pixel window for resampling, and uses the fractional part ($\delta_X$, $\delta_Y$) to select the coefficients from the coefficient table.

The effectiveness of the disclosed data pixel processing method is demonstrated by comparing recoveries of holograms using a pixel-matched detector with recoveries using a 4/3 oversampled detector. Stacks of 100 angularly multiplexed holograms are recorded using a 532 nm laser and a 720×720 12 μm pitch data page with a 92% fill factor. The dimensions of the over-sampled detector limited the data page size. The data is then Fourier transformed (FT) using an FT lens and filtered with an aperture with a width 1.08 times larger than Nyquist (the Nyquist aperture is roughly 0.9 mm×0.9 mm with the example system). The filtered, Fourier transformed data is then imaged into a 1.5 mm thick InPhase Technologies Tapestry HDS3000 media. The resultant holograms are read out using a 19 mW beam in a phase conjugate configuration.

Figure 14:
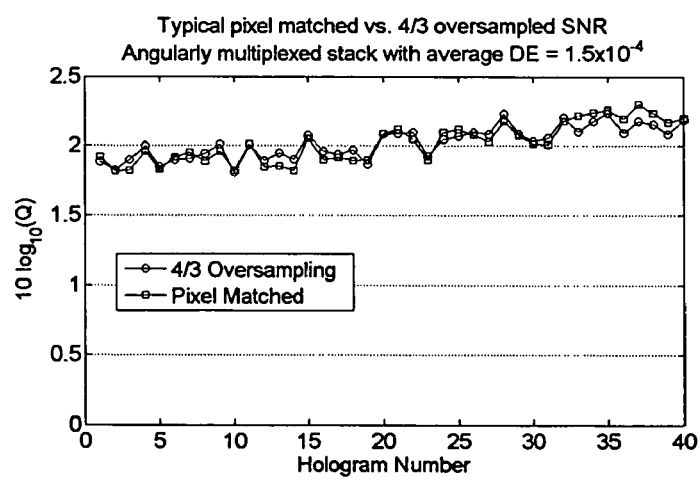
FIG. 14 illustrates a comparison of an oversampling method to a pixel matched method according to an embodiment of the present invention.

FIG. 14 illustrates a comparison of an oversampling method to a pixel-matched method according to an embodiment of the present invention. The horizontal axis indicates number of holograms and the vertical axis indicates a $\log_{10}$ of the Q metric. The square-curve shows the pixel-matched method and the circle-curve shows the 4/3 oversampling method. Under nominal conditions the oversampled detector has performance substantially similar to that of the pixel-matched detector. The 4/3 oversampled detector is able to compensate for camera misalignments of up to 0.2 mm in the transverse directions, 0.4 mm in the longitudinal direction and rotations of 0.2° without SNR penalties.

However, with weaker holograms, the 4/3 oversampled detector has higher SNR than the pixel matched detector. By lowering the hologram write exposure, the diffraction efficiency of the holograms is controlled. The oversampled detector is more robust at lower diffraction efficiencies.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

What is claimed is:

1. A method for processing data pixels in a holographic data storage system, the holographic data storage system comprises at least one microprocessor unit, a memory, a light source, a storage medium, a detector, and one or more microcontrollers, and the holographic data storage system stores at least one holographic image, comprising:

recovering a data pixel image from a recorded data page having predetermined reserved blocks assigned throughout, wherein each reserved block comprises known pixel patterns;

determining local alignment of data pixel image positions by computing a best match between regions of the detector and the predetermined reserved blocks, wherein the detector has more than 1 and less than 1.8 times greater density of pixels in a linear dimension than the holographic image, wherein determining local alignment of data pixel image positions further comprises matching a pattern of the data page at the detector to a known target pattern by performing a covariance calculation, and wherein performing the covariance calculation comprises selecting one or more reserved blocks where a contribution of autocorrelation noise to covariance values neighboring a peak goes to zero, and selecting a predetermined interior region of the reserved blocks, whereby neighboring pixel data to the reserved blocks in the recovered image do not affect the covariance values of the peak or its neighbors; and processing the data pixels in accordance with the corresponding local alignment of data pixel image positions.

2. The method of claim 1, wherein the reserved blocks are 8 by 8 pixel blocks distributed on a grid of each data page at a spacing of 64 pixels in both horizontal and vertical directions.

3. The method of claim 1, wherein determining local alignment of data pixel image positions comprises:

oversampling a portion of the reserved blocks at the detector for producing a target pattern; wherein the target pattern comprises a higher density of pixels than the holographic image.

4. The method of claim 3, wherein producing a target pattern comprises:

creating a binary grid for representing the reserved blocks;

determining a size of an integral interior region of detector pixels without introducing data noise;

generating the target pattern by superimposing an oversampled detector pixel array on the reserved blocks; and integrating signals within the detector pixels numerically.

5. The method of claim 1, wherein matching a pattern of the data page comprises:

computing a covariance matrix on a set of reserved blocks in the data page.

6. The method of claim 1, wherein matching a pattern comprises:

performing a dot-product for determining a degree of matching between the holographic image and the known target pattern at each whole pixel offset.

7. The method of claim 1 further comprising:

determining offset vectors of the data page from the local alignment of data pixel image positions; and filtering offset vectors of the data page determined from the local alignment of data pixel image positions.

8. The method of claim 7, wherein filtering the position errors comprises:

averaging the offset vectors of the data page.

9. The method of claim 7, wherein filtering the offset vectors comprises:

comparing difference between neighboring offset vectors to a predetermined threshold;

identifying a offset vector to be an invalid vector if either a horizontal or vertical component of the offset vector differ by more than the predetermined threshold; and replacing the invalid vector with a vector representing neighbor averages.

10. The method of claim 9, wherein filtering the offset vectors further comprises:
applying a low-pass filter for reducing noise of the offset vectors at the detector.

11. The method of claim 1, wherein the detector has more than 1 and less than 4/3, inclusive of 4/3, times greater density of pixels in a linear dimension than the holographic image.

12. The method of claim 1, wherein the detector has more than 1 and less than 17/12, inclusive of 17/12, times greater density of pixels in a linear dimension than the holographic image.

13. A method for processing data pixels in a holographic data storage system, the holographic data storage system comprises at least one microprocessor unit, a memory, a light source, a storage medium, a detector, and one or more microcontrollers, and the holographic data storage system stores at least one holographic image, comprising:
recovering a data pixel image from a recorded data page having predetermined reserved blocks assigned throughout, wherein each reserved block comprises known pixel patterns;
determining whole-pixel local alignment of data pixel image positions by computing a best match between regions of the detector and the predetermined reserved blocks, wherein the detector has more than 1 and less than 1.8 times greater density of pixels in a linear dimension than the holographic image, wherein determining whole-pixel local alignment of data pixel image positions further comprises matching a pattern of the data page at the detector to a known target pattern by performing a covariance calculation, wherein matching a pattern comprises performing a dot-product for determining a degree of matching between the holographic image and the known target pattern at each whole pixel offset, and wherein the known target pattern includes one or more reserved blocks where a contribution of autocorrelation noise to covariance values neighboring a peak goes to zero;
interpolating between a peak and its neighbors to determine fractional-pixel local alignment of data pixel image positions; and
processing the data pixels in accordance with their corresponding fractional-pixel local alignment of data pixel image positions.

14. The method of claim 13, wherein performing a covariance calculation comprises selecting a predetermined interior region of the reserved blocks, whereby the neighboring pixel data do not affect the covariance calculation; and wherein interpolating between a peak and its neighbors comprises selecting an interpolation method according to the covariance values of said peak and its neighbors.

15. A method for processing data pixels in a holographic data storage system, the holographic data storage system comprises at least one microprocessor unit, a memory, a light source, a storage medium, a detector, and one or more microcontrollers, and the holographic data storage system stores at least one holographic image, comprising: recovering a data pixel image from a recorded data page having predetermined reserved blocks assigned throughout, wherein each reserved block comprises known pixel patterns;
determining local alignment of data pixel image positions by computing a best match between regions of the detector and the predetermined reserved blocks, wherein the detector has more than 1 and less than 1.8 times greater density of pixels in a linear dimension than the holographic image, wherein determining local alignment of data pixel image positions further comprises matching a pattern of the data page at the detector to a known target pattern by performing a covariance calculation which comprises selecting a reserved block in which an interior sub-block has a zero covariance with each of the edge-bordering sub-blocks of said reserved block that have the same size as the interior sub-block;
selecting, for each covariance peak, an interpolation method according to the values of said peak and its neighbors; and
processing the data pixels in accordance with their corresponding local alignment of data pixel image positions.

16. A holographic data storage system comprising: at least one microprocessor unit for executing computer programs; a memory for storing an operating system and an application layer; a light source for providing a coherent beam of light; a storage medium for storing an encoded holographic image page; a detector for reading the encoded holographic image page; one or more microcontrollers for controlling the detector;
means for assigning predetermined reserved blocks throughout each data page, wherein each reserved block comprises known pixel patterns;
means for determining offset vectors of the data page by computing a best match between regions of the detector and the predetermined reserved blocks, wherein the detector has more than 1 and less than 1.8 times greater density of pixels in a linear dimension than the holographic image, wherein the means for determining the offset vectors further comprise means for matching a pattern of the data page at the detector to a known target pattern by performing a covariance calculation, wherein the means for performing the covariance calculation comprise:
means for selecting one or more reserved blocks where a contribution of autocorrelation noise to covariance values neighboring a peak goes to zero,
means for selecting a predetermined interior region of the reserved blocks, whereby neighboring pixel data to the reserved blocks in the recovered image do not affect the covariance values of the peak or its neighbors calculation; and
means for compensating the data pixels at the detector in accordance with their corresponding offset vectors of the data page.

17. The system of claim 16, wherein the reserved blocks are 8 by 8 pixel blocks distributed on a grid of each data page at a spacing of 64 pixels in both horizontal and vertical directions.

18. The system of claim 16, wherein the means for determining offset vectors comprise:
means for oversampling a portion of the reserved blocks at the detector for producing a target pattern; wherein the target pattern comprises a higher density of pixels than the holographic image.

19. The system of claim 18, wherein the means for producing a target pattern comprise:
means for creating a binary grid for representing the reserved blocks;
means for determining a size of an integral interior region of detector pixels without introducing data noise;
means for generating the target pattern by superimposing an oversampled detector pixel array on the reserved blocks; and
means for integrating signals within the detector pixels numerically.

20. The system of claim 16, wherein the means for matching a pattern of the data page comprise:

means for computing a covariance matrix on a set of reserved blocks in the data page.

21. The system of claim 16, wherein the means for matching a pattern comprise:

means for performing a dot-product for determining whether the holographic images match at a whole pixel offset.

22. The system of claim 21 further comprising:

means for interpolating between a peak and its neighbors to determine fractional pixel alignment position.

23. The system of claim 16, wherein the means for performing a covariance calculation further comprise:

means for selecting a reserved block in which an interior sub-block has a zero covariance with each of the edge-bordering sub-blocks of said reserved block that have the same size as the interior sub-block.

24. The system of claim 16 further comprising:

means for filtering the offset vectors of the data page.

25. The system of claim 24, wherein the means for filtering the position errors comprise:

means for averaging the position errors of the data page.

26. The system of claim 24, wherein the means for filtering the position errors comprise:

means for comparing difference between neighboring position errors to a predetermined threshold;

means for identifying a pixel offset vector to be an invalid vector if either a horizontal or vertical component of the pixel offset vector differ by more than the predetermined threshold; and means for replacing the invalid vector with a vector representing neighbor averages.

27. The system of claim 26, wherein the means for filtering the position errors further comprise:

means for applying a low-pass filter for reducing noise of the position errors at the detector.

28. The system of claim 16, wherein the detector has more than 1 and less than 4/3, inclusive of 4/3, times greater density of pixels in a linear dimension than the holographic image.

29. The system of claim 16, wherein the detector has more than 1 and less than 17/12, inclusive of 17/12, times greater density of pixels in a linear dimension than the holographic image.

* * * * *